US009367214B2

(12) United States Patent
Gupta et al.

(10) Patent No.: US 9,367,214 B2
(45) Date of Patent: Jun. 14, 2016

(54) WIRELESS COMMUNICATION DEVICE HAVING DETERMINISTIC CONTROL OF FOREGROUND ACCESS OF THE USER INTERFACE

(71) Applicant: QUALCOMM Incorporated, San Diego, CA (US)

(72) Inventors: Rashim Gupta, San Diego, CA (US); Mark Aaron Lindner, Verona, WI (US); Fnu Tejaswini, Andhra Pradesh (IN)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 14/026,159

(22) Filed: Sep. 13, 2013

(65) Prior Publication Data
US 2014/0019873 A1 Jan. 16, 2014

Related U.S. Application Data

(63) Continuation-in-part of application No. 12/134,129, filed on Jun. 5, 2008, now Pat. No. 8,555,201.

(51) Int. Cl.
*G09G 5/14* (2006.01)
*G06F 3/0484* (2013.01)
(Continued)

(52) U.S. Cl.
CPC ............ *G06F 3/0484* (2013.01); *G06F 9/4443* (2013.01); *H04L 67/36* (2013.01)

(58) Field of Classification Search
CPC ... G06F 3/0484; G06F 9/4443; G06F 3/1446; G06F 2203/04803; H04L 67/36; G09G 5/14
See application file for complete search history.

(56) References Cited

U.S. PATENT DOCUMENTS 4,550,386 A * 10/1985 Hirosawa ................ G06F 3/153
345/505
4,794,386 A * 12/1988 Bedrij ....................... G09G 5/14
345/684
(Continued)

FOREIGN PATENT DOCUMENTS

CN 1480855 A 3/2004
JP 2004005213 A 1/2004
(Continued)

OTHER PUBLICATIONS

Partial International Search Report—PCT/US2014/055567—ISA/EPO—Nov. 26, 2014.
(Continued)

*Primary Examiner* — Shen Shiau
(74) *Attorney, Agent, or Firm* — Raphael Freiwirth; Michael F. Taveria

(57) ABSTRACT

A wireless communication device that has one or more applications resident on a computer platform, a wireless communication interface, a display, and a user interface that, at least, appears on the display. The one or more applications and/or an arbiter that is resident on the computer platform may determine which user interface of the one or more applications resident on the computer platform controls the display based upon a predetermined criteria when the user interfaces compete for control of the display. In another embodiment, an application that does not comply with the determination of which application controls the display may be terminated. A method may be performed to determine which application may control a display of a plurality of displays of the wireless communication device. A method may be performed to associate user input data with applications when there is a change of control of a display.

80 Claims, 13 Drawing Sheets

(51) Int. Cl.
*H04L 29/08* (2006.01)
*G06F 9/44* (2006.01)

(56) References Cited

U.S. PATENT DOCUMENTS

| | | | | |
|---|---|---|---|---|
| 5,388,202 A * | 2/1995 | Squires | G06F 3/0481 | 715/782 |
| 5,841,435 A * | 11/1998 | Dauerer | G06F 3/0481 | 715/764 |
| 5,856,826 A * | 1/1999 | Craycroft | G06F 9/4443 | 715/781 |
| 5,889,517 A * | 3/1999 | Ueda | G09G 5/14 | 715/803 |
| 5,973,702 A * | 10/1999 | Orton | G06F 9/443 | 345/619 |
| 5,995,103 A * | 11/1999 | Ashe | G09G 5/14 | 715/804 |
| 6,002,395 A * | 12/1999 | Wagner | G06F 9/4443 | 345/173 |
| 6,724,403 B1 * | 4/2004 | Santoro | G09G 5/14 | 715/765 |
| 7,068,291 B1 * | 6/2006 | Roberts | G09G 5/14 | 345/635 |
| 7,106,298 B1 * | 9/2006 | Turner | H04L 41/22 | 345/1.1 |
| 7,356,775 B2 * | 4/2008 | Ruelle | G06F 3/0481 | 715/802 |
| 7,478,341 B2 * | 1/2009 | Dove | G06F 9/4443 | 715/790 |
| 7,627,518 B1 * | 12/2009 | West | G06F 3/0481 | 705/35 |
| 7,660,914 B2 * | 2/2010 | Perez | G06F 1/1613 | 710/15 |
| 7,707,249 B2 | 4/2010 | Spataro et al. | | |
| 7,773,989 B2 | 8/2010 | Tobe et al. | | |
| 8,126,964 B2 * | 2/2012 | Pretlove | H04L 67/42 | 709/204 |
| 8,291,339 B2 * | 10/2012 | Tanaka | G06F 3/0481 | 715/768 |
| 8,555,201 B2 | 10/2013 | Gupta et al. | | |
| 8,627,207 B2 * | 1/2014 | Meaney | G06F 3/048 | 715/725 |
| 8,677,284 B2 * | 3/2014 | Aguilar | G06F 3/04815 | 715/830 |
| 8,826,131 B2 * | 9/2014 | Suito | G11B 19/025 | 386/291 |
| 8,863,026 B2 * | 10/2014 | Yamada | G06F 3/0481 | 715/781 |
| 8,907,909 B2 * | 12/2014 | Bello | G06F 3/0488 | 345/173 |
| 8,948,826 B2 * | 2/2015 | Mitsunaga | H04M 1/0235 | 345/173 |
| 9,104,468 B2 | 8/2015 | Todoroki | | |
| 9,152,176 B2 * | 10/2015 | Gimpl | G06F 1/1616 | |
| 9,213,538 B1 * | 12/2015 | Ladd | G06F 8/70 | |
| 2001/0047435 A1 * | 11/2001 | Dove | G06F 9/4443 | 719/310 |
| 2002/0037753 A1 * | 3/2002 | Shitahaku | H04M 1/72522 | 455/566 |
| 2002/0065111 A1 | 5/2002 | Otsuka | | |
| 2003/0126330 A1 | 7/2003 | Balasuriya | | |
| 2003/0222911 A1 * | 12/2003 | Numano | G06F 9/526 | 715/761 |
| 2003/0231143 A1 * | 12/2003 | Nakamura | G06F 3/1423 | 345/1.1 |
| 2003/0231259 A1 * | 12/2003 | Yui | G06F 3/14 | 348/564 |
| 2003/0236800 A1 * | 12/2003 | Goeltzenleuchter | G06F 11/1492 | |
| 2004/0015079 A1 | 1/2004 | Berger et al. | | |
| 2004/0023646 A1 | 2/2004 | Inami et al. | | |
| 2004/0036662 A1 * | 2/2004 | Sakumura | G09G 5/14 | 345/1.3 |
| 2004/0095401 A1 * | 5/2004 | Tomimori | G06F 9/4443 | 715/864 |
| 2004/0192401 A1 * | 9/2004 | Kaida | H04M 1/72522 | 455/566 |
| 2005/0033799 A1 | 2/2005 | Shin et al. | | |
| 2005/0070251 A1 * | 3/2005 | Satake | H04L 12/1859 | 455/411 |
| 2005/0148358 A1 | 7/2005 | Lin et al. | | |
| 2005/0198394 A1 * | 9/2005 | Waldorf | G06F 15/16 | 709/246 |
| 2005/0223352 A1 * | 10/2005 | Nishida | G06F 9/542 | 717/100 |
| 2005/0235214 A1 * | 10/2005 | Shimizu | G06F 3/0481 | 715/740 |
| 2005/0243760 A1 * | 11/2005 | Yoshioka | G06F 9/4843 | 370/328 |
| 2005/0262302 A1 * | 11/2005 | Fuller | G06F 1/1613 | 711/119 |
| 2005/0264589 A1 * | 12/2005 | Kimoto | G09G 5/391 | 345/698 |
| 2005/0268014 A1 * | 12/2005 | Geib | G06F 9/4881 | 710/240 |
| 2006/0026281 A1 | 2/2006 | Hodgson et al. | | |
| 2006/0097955 A1 * | 5/2006 | Kato | H04N 21/443 | 345/1.1 |
| 2006/0215696 A1 * | 9/2006 | Fukuta | G06Q 10/10 | 370/469 |
| 2006/0271618 A1 * | 11/2006 | Kokubo | H04M 1/42586 | 709/202 |
| 2007/0050778 A1 * | 3/2007 | Lee | H04N 5/44591 | 718/107 |
| 2007/0127823 A1 * | 6/2007 | Seeber | G06F 17/30256 | 382/218 |
| 2007/0214426 A1 * | 9/2007 | Ruelle | G06F 3/0481 | 715/767 |
| 2008/0030426 A1 * | 2/2008 | Hashimoto | G06F 3/1431 | 345/1.3 |
| 2008/0148298 A1 | 6/2008 | Chatterjee et al. | | |
| 2008/0163258 A1 * | 7/2008 | Balasubramanian | G05B 23/0267 | 719/318 |
| 2008/0318610 A1 | 12/2008 | Bhaskaran et al. | | |
| 2009/0132942 A1 * | 5/2009 | Santoro | G06F 3/0481 | 715/765 |
| 2009/0137278 A1 * | 5/2009 | Haru | H04M 1/0245 | 455/566 |
| 2009/0158371 A1 * | 6/2009 | Lo | H04L 12/2807 | 725/110 |
| 2009/0225002 A1 * | 9/2009 | Imai | G09G 3/003 | 345/9 |
| 2009/0251418 A1 * | 10/2009 | Cho | G06F 1/1626 | 345/169 |
| 2009/0276788 A1 | 11/2009 | Homma | | |
| 2009/0300538 A1 * | 12/2009 | Okamura | G09G 5/00 | 715/779 |
| 2009/0307619 A1 * | 12/2009 | Gupta | H04L 67/36 | 715/764 |
| 2010/0041441 A1 * | 2/2010 | Kato | G06F 9/543 | 455/566 |
| 2010/0058205 A1 * | 3/2010 | Vakil | G06F 1/1616 | 715/761 |
| 2010/0064244 A1 * | 3/2010 | Kilpatrick, II | G06F 1/1616 | 715/773 |
| 2010/0066698 A1 * | 3/2010 | Seo | G06F 3/04883 | 345/173 |
| 2010/0077346 A1 * | 3/2010 | Kawashima | G06F 9/4443 | 715/802 |
| 2010/0083122 A1 * | 4/2010 | Kozloski | G06F 3/023 | 715/737 |
| 2010/0088634 A1 * | 4/2010 | Tsuruta | G06F 3/0488 | 715/800 |
| 2010/0110480 A1 * | 5/2010 | Satake | G06F 9/4443 | 358/1.15 |
| 2010/0241958 A1 * | 9/2010 | Fish | G06F 3/04886 | 715/702 |
| 2010/0267423 A1 * | 10/2010 | Yamakita | G06F 3/0238 | 455/566 |
| 2010/0306713 A1 | 12/2010 | Geisner et al. | | |
| 2011/0047288 A1 * | 2/2011 | Sakano | H04W 48/08 | 709/236 |

(56) References Cited

U.S. PATENT DOCUMENTS

| | | | |
|---|---|---|---|
| 2011/0169840 A1* | 7/2011 | Bakalash | G06T 1/00 345/505 |
| 2011/0181492 A1* | 7/2011 | Soeda | G09G 5/14 345/1.1 |
| 2011/0193806 A1* | 8/2011 | Kim | G06F 1/1615 345/173 |
| 2011/0202936 A1* | 8/2011 | Todoroki | G06F 3/0481 719/329 |
| 2011/0216064 A1* | 9/2011 | Dahl | G06F 1/1616 345/428 |
| 2011/0258573 A1 | 10/2011 | Wetzer et al. | |
| 2011/0260964 A1* | 10/2011 | Mujkic | G06F 3/0481 345/156 |
| 2011/0273387 A1* | 11/2011 | Urawaki | G06F 1/1615 345/173 |
| 2011/0283291 A1 | 11/2011 | Tobe et al. | |
| 2011/0292081 A1* | 12/2011 | Matsunobu | G06F 3/1423 345/655 |
| 2012/0023437 A1* | 1/2012 | Moriwaki | G06F 3/1423 715/781 |
| 2012/0026069 A1* | 2/2012 | Ohsaki | G06F 1/1616 345/1.2 |
| 2012/0081269 A1* | 4/2012 | de Paz | G06F 1/1616 345/1.3 |
| 2012/0081271 A1* | 4/2012 | Gimpl | G06F 1/1616 345/1.3 |
| 2012/0081307 A1* | 4/2012 | Sirpal | G06F 1/1616 345/173 |
| 2012/0110497 A1* | 5/2012 | Gimpl | G06F 1/1616 715/778 |
| 2012/0117290 A1* | 5/2012 | Sirpal | G06F 1/1632 710/303 |
| 2012/0117495 A1* | 5/2012 | Sirpal | G06F 1/1616 715/761 |
| 2012/0133601 A1* | 5/2012 | Marshall | G06F 19/3406 345/173 |
| 2012/0147270 A1* | 6/2012 | Kim | H04N 5/44591 348/564 |
| 2012/0169771 A1* | 7/2012 | Muratsu | G09G 5/00 345/637 |
| 2012/0192113 A1* | 7/2012 | Higuchi | G06F 1/162 715/835 |
| 2012/0290966 A1* | 11/2012 | Chae | G09G 5/14 715/778 |
| 2012/0299954 A1* | 11/2012 | Wada | G06F 3/1423 345/619 |
| 2012/0320031 A1* | 12/2012 | Fujiwaka | G06F 3/14 345/418 |
| 2012/0326947 A1 | 12/2012 | Fujiwaka | |
| 2013/0002688 A1* | 1/2013 | Zhu | G06F 3/1446 345/502 |
| 2013/0007842 A1* | 1/2013 | Park | G06F 21/74 726/3 |
| 2013/0038636 A1* | 2/2013 | Fujiwaka | G06F 1/1643 345/681 |
| 2013/0047110 A1* | 2/2013 | Shimizu | G06F 3/0486 715/769 |
| 2013/0076672 A1* | 3/2013 | Sirpal | G06F 3/1438 345/173 |
| 2013/0120294 A1* | 5/2013 | Sun | G06F 3/041 345/173 |
| 2013/0128118 A1* | 5/2013 | Chiang | H04N 7/0255 348/552 |
| 2013/0135182 A1* | 5/2013 | Jung | G09G 3/00 345/30 |
| 2013/0135294 A1* | 5/2013 | An | G06F 3/0488 345/419 |
| 2013/0210488 A1* | 8/2013 | Lee | G06F 3/14 455/557 |
| 2013/0222321 A1* | 8/2013 | Buening | G06F 3/173 345/173 |
| 2013/0305177 A1* | 11/2013 | Xia | G06F 3/0484 715/765 |
| 2013/0305184 A1* | 11/2013 | Kim | G06F 3/0481 715/781 |
| 2013/0321340 A1* | 12/2013 | Seo | G06F 1/1641 345/174 |
| 2013/0347024 A1* | 12/2013 | Sugiue | H04N 21/25875 725/25 |
| 2014/0007013 A1* | 1/2014 | Yun | G06F 3/04817 715/835 |
| 2014/0053198 A1* | 2/2014 | Sirpal | H04N 21/8173 725/43 |
| 2014/0059494 A1* | 2/2014 | Lee | G06F 3/0482 715/835 |
| 2014/0071145 A1* | 3/2014 | Lee | G09G 5/003 345/545 |
| 2014/0089833 A1* | 3/2014 | Hwang | G06F 3/04817 715/769 |
| 2014/0149927 A1* | 5/2014 | Yoon | G09G 5/10 715/794 |
| 2014/0164966 A1* | 6/2014 | Kim | G06F 3/04886 715/769 |
| 2014/0195935 A1* | 7/2014 | Yokoyama | G06F 3/0488 715/761 |
| 2014/0218375 A1* | 8/2014 | Kim | G06F 3/147 345/501 |
| 2014/0295795 A1* | 10/2014 | Miyazaki | H04W 12/06 455/411 |
| 2014/0325428 A1* | 10/2014 | Lee | G06F 3/0481 715/781 |
| 2014/0351722 A1* | 11/2014 | Frederickson | G06F 9/4443 715/761 |
| 2015/0012831 A1* | 1/2015 | Boggess | G06F 3/1454 715/733 |
| 2015/0040062 A1* | 2/2015 | Hollis | G06F 3/04845 715/800 |
| 2015/0062295 A1* | 3/2015 | Yoneda | H04N 13/0029 348/43 |
| 2015/0243065 A1* | 8/2015 | Yanagida | G06T 11/60 345/635 |

FOREIGN PATENT DOCUMENTS

| | | |
|---|---|---|
| JP | 2004078936 A | 3/2004 |
| JP | 2005071340 A | 3/2005 |
| JP | 2005514837 A | 5/2005 |
| JP | 2006333338 A | 12/2006 |
| WO | WO-0075870 A1 | 12/2000 |
| WO | 03058466 A1 | 7/2003 |
| WO | WO-2007030682 A2 | 3/2007 |
| WO | WO-2009148776 A2 | 12/2009 |
| WO | WO-2012044777 A1 | 4/2012 |

OTHER PUBLICATIONS

International Search Report and Written Opinion—PCT/US2014/055567—ISA/EPO—Jan. 29, 2015.

* cited by examiner

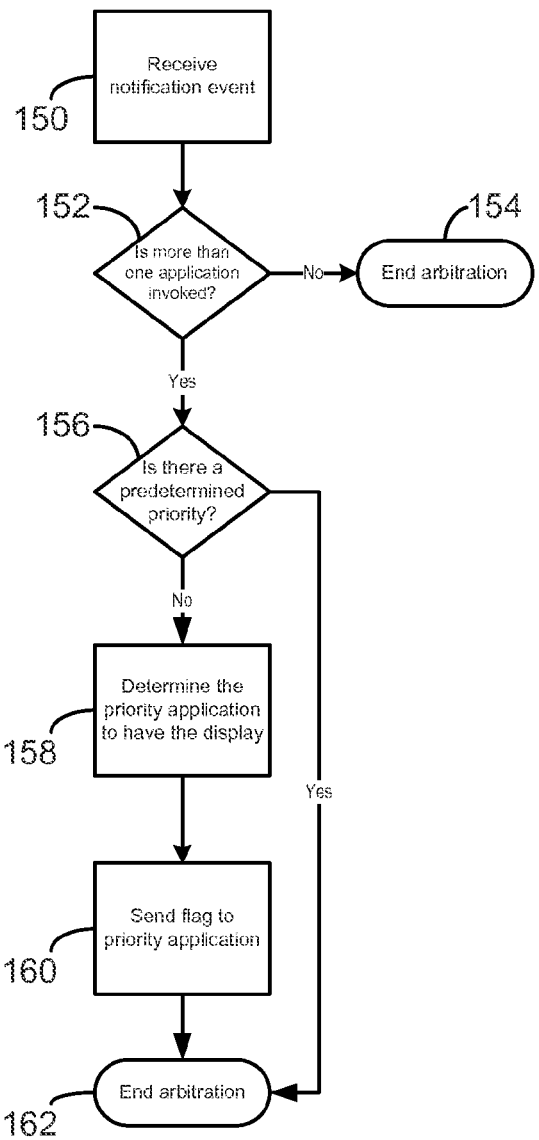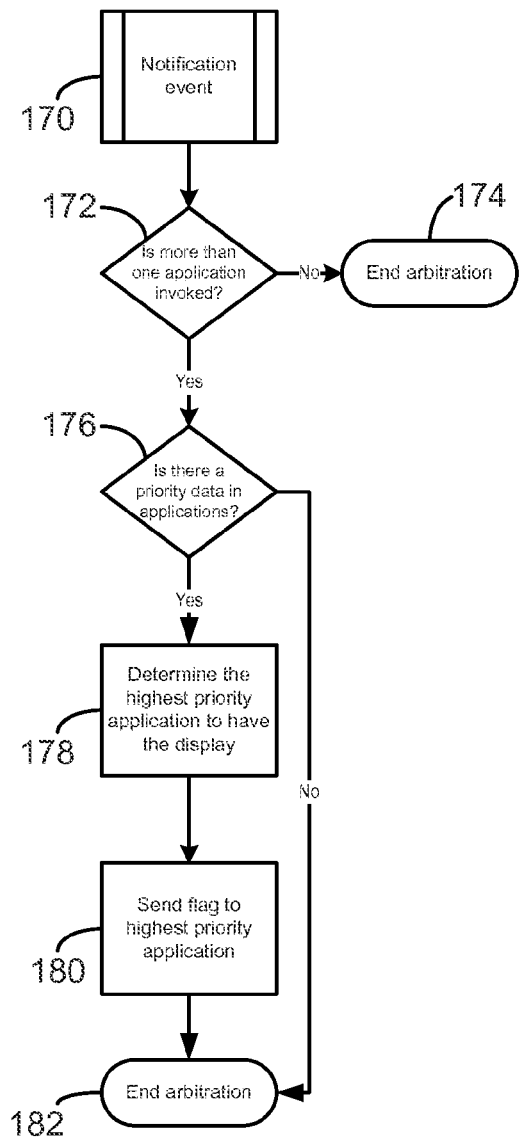
Fig. 5
Fig. 6

WIRELESS COMMUNICATION DEVICE HAVING DETERMINISTIC CONTROL OF FOREGROUND ACCESS OF THE USER INTERFACE

RELATED APPLICATIONS

The present application is a continuation-in-part of U.S. Provisional application Ser. No. 12/134,129, entitled "WIRELESS COMMUNICATION DEVICE HAVING DETERMINISTIC CONTROL OF FOREGROUND ACCESS OF THE USER INTERFACE" filed Jun. 5, 2008, the entire contents of which are hereby incorporated by reference.

BACKGROUND OF THE INVENTION

1. Field of the Invention

The present invention relates to portable wireless communication devices. More specifically, the present invention relates a wireless communication device that can deterministically control which user interface of the resident applications controls the display of the device.

2. Description of the Related Art

In modern wireless communication networks, many of the wireless communication devices have resident computer platforms with operating systems and software applications that can be run, either individually or in parallel, on the computer platform. The software applications can vie for control of the resident user interface for the wireless communication device, which often is displayed on a resident display of the wireless communication device, and several problems can result from the collision of executing applications trying to seize control of the user interface.

For example, in an operating system with a notification mechanism to send events to other resident applications, the operating system may typically use notifications to broadcast events to multiple software applications, such as the receipt of incoming communications, the execution of various applications, and the status of resident hardware components. The resident software applications can register for notifications using a common operating system application-programming interface ("API"). Also, a resident software application can implement a "notify" class and send notifications to other software applications as intended. Once an application receives an event, the resident software application is typically free to act and come to the foreground on the API.

One problem occurs if there are multiple applications that can handle a specific event and they all want to come to the foreground of the UI. This can cause thrashing and undesirable user behavior where each application tries to come to the foreground, and thus, the operating system may not let any one application stay on top in the UI. One prior art solution to this problem has been simply to allow foreground thrashing, as a consequence of the broadcast event model. However, simply letting the UI thrash is undesirable as the applications do have any specified order in which they seize and display upon the UI, and high-priority applications are left to contend with low-priority applications for control.

It would therefore be advantageous to provide a system and method for a wireless communication device to control which of a plurality of resident applications may have control of the UI if multiple applications are simultaneously invoked and compete for control of the UI. Such system and method should be able to prioritize which application may have the UI, without utilizing significant device resources in determining the control. It is thus to such a system and method of a wireless communication device determining resident application control of the UI that the present invention is primarily directed.

SUMMARY OF THE INVENTION

Briefly described, there is provided herein a wireless communication device that has one or more applications resident on a local computer platform, and includes at least a wireless communication interface, and a display. Each application has a user interface that it uses to interact with the user. The arbiter application that resides on the computer platform controls which application may bring its user interface to the foreground based upon a predetermined criteria, such as a prioritization scheme, a most recently used algorithm, or based upon the nature of the event invoking multiple applications.

In one embodiment, the method of determining which user interface of the resident applications on the computer platform of the wireless communication device controls the display, with the user interface, at least, appearing on the display of the wireless communication device and through which a user of the wireless communication device interacts with resident applications, includes the steps of displaying the user interface on the display of the wireless communication device, where the display is configured to be selectively controlled by the user interface of one or more applications resident on the computer platform, then either receiving a request at an arbiter from one or more of the resident applications to control the display, with the arbiter resident on the computer platform, and determining, at the arbiter, which application of the user interfaces of the one or more resident applications controls the user interface based upon a predetermined criteria, or if the one or more resident applications include priority data indicating a priority of control of the display, the one or more resident applications may determine which user interface of which application controls the display.

In another embodiment, a method of assigning control of each of a plurality of display to an application of a plurality of applications resident on a wireless communication device may include determining via an arbiter a first application of the plurality of applications that controls one of the plurality of displays based upon predetermined criteria in response to receiving a notification event that simultaneously invokes more than one application, determining whether an activity relevant to a second application of the plurality of applications is detected in response to the determination via the arbiter that the first application controls the one of the plurality of displays, ordering a list of viable displays of the plurality of displays in order of priority for the second application in response to detecting the activity relevant to the second application, selecting a display in the ordered list of viable displays of the plurality of displays, determining whether the selected display is in use by a third application, and sending to the second application a flag that assigns control of a foreground of the selected display in response to determining the selected display is not in use by the third application.

In another embodiment, a method of associating user input data with a plurality of applications resident on a wireless communication device in accordance with a user intent may include determining via an arbiter a first application of the plurality of applications that controls a display of the wireless communication device based upon predetermined criteria in response to receiving a notification event that simultaneously invokes more than one application, detecting, in response to the determination via the arbiter that the first application controls the display, a change in a control of the display from the first application in the plurality of applications to a second application in the plurality of applications, identifying a first input received before the detected change in the control of the display and a second input received after the detected change in the control of the display, determining whether the first input was received within a first time threshold of the detected change in the control of the display, determining whether the second input was received within a second time threshold of the detected change in the control of the display, and associating the second input with the second application in response to determining that the first input was not received within the first time threshold or the second input was not received within the second time threshold.

In another embodiment, a method of controlling a plurality of applications resident on a wireless communication device may include determining via an arbiter, such as an arbiter application that has administrative privileges, a first application of the plurality of applications controls a display of the wireless communication device based upon predetermined criteria in response to receiving a notification event that simultaneously invokes more than one application, determining whether a second application of the plurality of applications did not comply with the determination via the arbiter that the first application of the plurality of applications controls the display, and terminating the second application in response to determining that the second application of the plurality of applications did not comply.

The present system and method are therefore advantageous in that they provide a wireless communication device with the ability to control which one of a plurality of invoked or active resident UI applications may have control of the display, such as is caused with an invoking event, to minimize thrashing in control of the display. There are several embodiments to prioritize the application control of the display which allows implementation in a variety of wireless environments. The determination of the control of the display may accordingly be accomplished without having to devote significant device processing resources in arbitrating control of the display.

Other objects, features, and advantages of the present invention may become apparent after review of the Brief Description of the Drawings, Detailed Description of the Invention, and the Claims.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 5 is a process flow diagram of one embodiment of a method for an arbiter determining priority for display control between a plurality of invoked wireless communication device-resident applications.

FIG. 6 is a process flow diagram of one embodiment of a method for determining priority for display control between a plurality of invoked wireless communication device-resident applications based upon priority data resident in the applications seeking control of the display.

DETAILED DESCRIPTION

The various embodiments may be described in detail with reference to the accompanying drawings. Wherever possible, the same reference numbers may be used throughout the drawings to refer to the same or like parts. References made to particular examples and implementations are for illustrative purposes, and are not intended to limit the scope of the invention or the claims.

In this description, the terms "communication device," "wireless device," "wireless communication device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. All methods of interaction between applications are intended to be encompassed herein, to include all forms of invocation, execution, calling, and data exchanging. Further, like numerals refer to like elements throughout the several views, and the articles "a" and "the" includes plural references, unless otherwise specified in the description.

Figure 1:
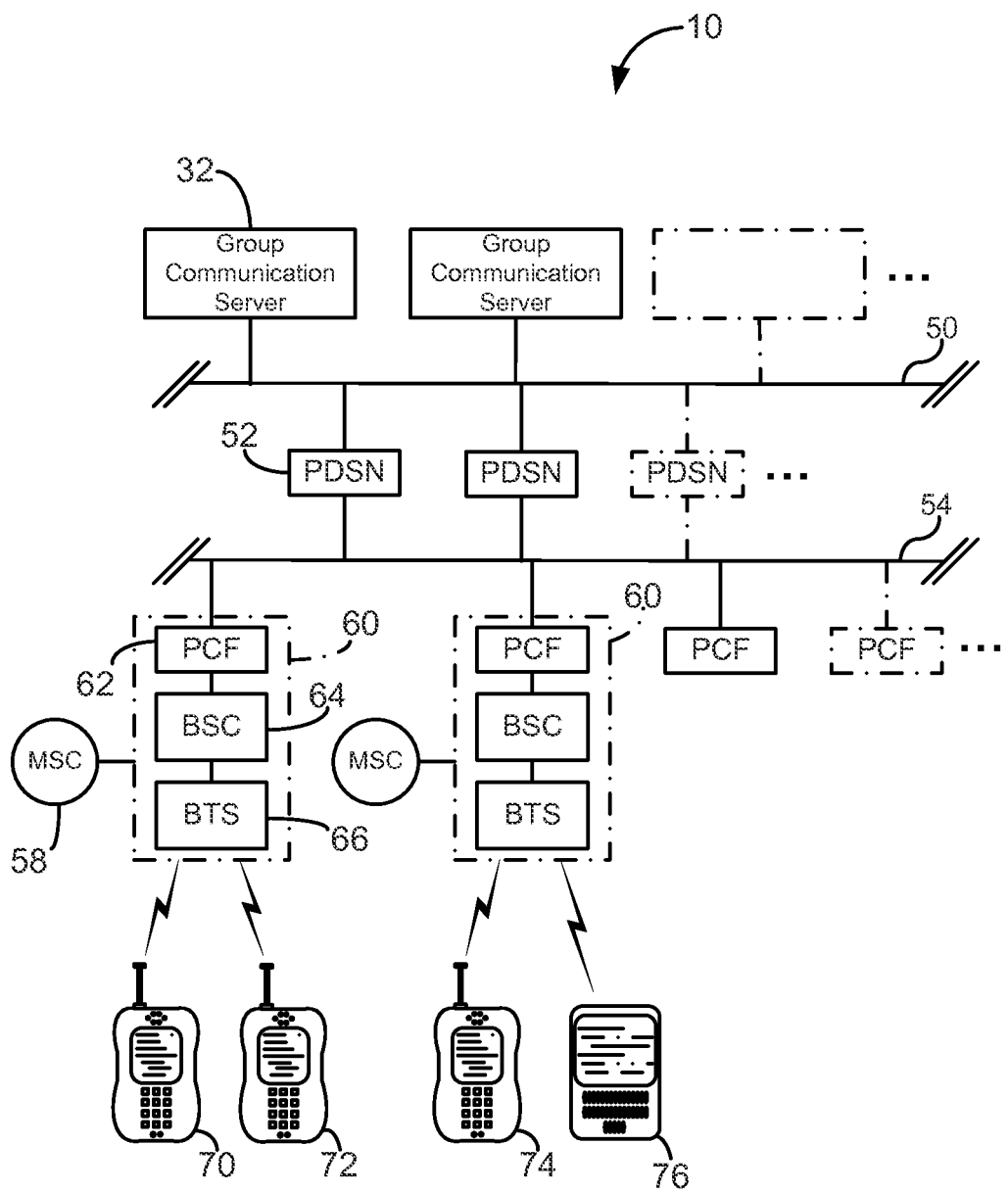
FIG. 1 is a representative diagram of one embodiment of a wireless network in a common cellular telecommunication configuration, having a group communication server control communications between the wireless telecommunication devices of PTT group members.

With reference to the figures in which like numerals represent like elements throughout, FIG. 1 is a representative diagram of one embodiment of a system 10 with a wireless network in a common cellular telecommunication configuration, with communications occurring between the wireless communication devices 70, 72, 74, 76. The system 10 here also includes a series of group communication computer devices (group communication servers) 32 that support a push-to-talk (PTT) system. The wireless network is merely exemplary and may include any system whereby remote modules communicate over-the-air between and among each other and/or between and among components of a wireless network, including, without limitation, wireless network carriers and/or servers. A series of group communication servers 32 are shown here as connected to a group communication server local area network (LAN) 50, but other computer devices may be accessible to the LAN 50 to provide functionality to any component on the network. Wireless communication devices 70, 72, 74, 76 may request packet data sessions from the group communication server(s) 32 using a data service option.

The back-office computer devices, such as the group communication server(s) 32, are connected to a wireless service providers packet data service node (PDSN) such as PDSN 52, shown here resident on a carrier network 54. Each PDSN 52 may interface with a base station controller 64 of a base station 60 through a packet control function (PCF) 62. The PCF 62 is typically located in the base station 60. The carrier network 54 controls messages (generally in the form of data packets) sent to a messaging service controller (MSC) 58. The carrier network 54 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 may be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as wireless communication devices 70,72,74,76, (e.g., cellular telephones) by short messaging service (SMS), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone (74 in FIG. 2), are being manufactured with increased computing capabilities and are becoming tantamount to personal computers and hand-held PDAs. These "smart" cellular telephones allow software developers to create software applications that are downloadable and executable on the processor of the wireless communication device. The wireless communication device, such as cellular telephone 74, may download many types of applications, such as web pages, applets, MIDlets, games and data. In wireless communication devices that have designated a communication group, the wireless communication device may directly connect with the other member of the set and engage in voice and data communication. However, all such direct communications may occur through, or at the control of, the group communication server 32. All data packets of the devices do not necessarily have to travel through the group communication server 32 itself, but the group communication server 32 is typically able to ultimately control the communication because it may typically be the only carrier network 54 component that is aware of and/or may retrieve the identity of the members of the communication group, or direct the identity of the members of the communication group 12 to another computer device. It should be appreciated that the number of computer components resident on server-side LAN 50, or across the wireless network, or Internet generally, are not limited.

In addition to voice communications between the wireless communication devices, other media may be sent such as graphic media, to include pictures in JPEG, TIF, and the like, audio files such as MP3, MP4, WAV, and the like. The media may also be streaming media, such as a multimedia application (Powerpoint, MOV file, and the like). The group-directed media may also be streaming media, or an interactive session on another computer device on the wireless communication network, such as a hosted game or private bulletin board. Also, for PTT communications, the group-directed communication could be half-duplex audio and/or video conferencing among members of the communication group in substantial real-time, or in delay.

Figure 2:
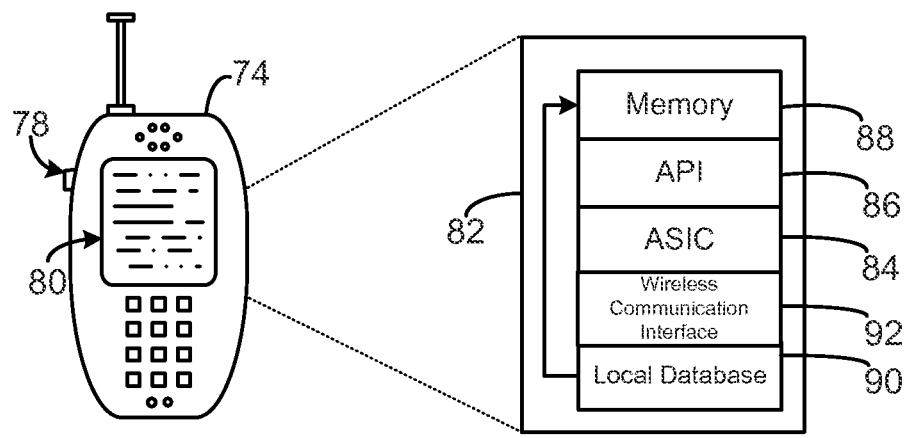
FIG. 2 is a block diagram illustrating the computer platform of the wireless telecommunication device, shown here with a push-to-talk (PTT) capability.

FIG. 2 is a block diagram illustrating one embodiment of the wireless communication device 74 being a mobile telephone embodied with a push-to-talk (PTT) button 78 that opens the direct communication to a target set of devices, i.e. other members of the communication group. The wireless communication device 74 is also shown as having a graphics display 80 to the user of the wireless communication device 74. The wireless communication device 74 includes a computer platform 82 that may handle voice and data packets, and receive and execute software applications transmitted across the wireless network to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless communication device 74 and is not normally upgradeable. The ASIC 84 or other processor executes an application programming interface ("API") layer 86, which includes the resident application environment, and may include the operating system loaded on the ASIC 84. The resident application environment interfaces with any resident programs in the memory 88 of the wireless communication device 74. An example of a resident application environment is the "binary runtime environment for wireless" (BREW®) software developed by QUALCOMM® for wireless communication device platforms.

As shown here, the wireless communication device 74 may be a mobile telephone 74, with a graphics display 80, but may also be any wireless communication device with a computer platform 82 as known in the art, such as a mobile device 76, or even a separate computer platform 82 that has a wireless communication portal, and may otherwise have a wired connection to a network or the Internet. Further, the memory 88 may be comprised of read-only or random-access memory (RAM and ROM), EPROM, EEPROM, flash cards, or any memory common to computer platforms. The computer platform 82 may also include a local database 90 for storage of software applications not actively used in memory 88. The local database 90 is typically comprised of one or more flash memory cells, but may be any secondary or tertiary storage device as known in the art, such as magnetic media, EPROM, EEPROM, optical media, tape, or soft or hard disk. The graphics display 80 may present not only information about the ongoing group call, but also the information on the group-directed media, to include a file preview as is more fully described herein.

In this embodiment of the wireless communication device 74, the computer platform 82 also includes a direct or wireless communication interface 92 that may open the direct communication channel from the wireless communication device 74. The direct or wireless communication interface 92 may also be part of the standard communication interface for the wireless communication device 74 which ordinarily carries the voice and data transmitted to and from the wireless communication device 74. The direct or wireless communication interface 92 typically is comprised of hardware as is known in the art.

In overview, the wireless communication device 74 has one or more applications resident upon the computer platform 82, which also includes the wireless communication interface 92, a display 80, and a user interface that, at least, appears on the display 80 (with one example of the user interface 140 shown in FIG. 4) and through which a user of the wireless communication device 74 interacts with the computer platform 82. Each application has a user interface, and in one embodiment, an arbiter (128 in FIG. 3B) may be resident on the computer platform 82 and configured to determine which application of the one or more UI applications controls the display 80 based upon a predetermined criteria. Examples of the predetermined criteria are: a priority list; allowing the last application to control the user interface to again control the user interface (most-recently-used algorithm); assigning a class to the one or more applications such that determining control is based upon the class of the application; allowing the control of the user interface based upon the specific type of data being handled in the user interface; and allowing the control based upon the type of data being received at the wireless communication interface 92. In other embodiments, the resident applications themselves may determine the priority, either alone or in conjunction with an arbiter 128, using predetermined criteria in the same manner as an arbiter 128.

Figure 3A:
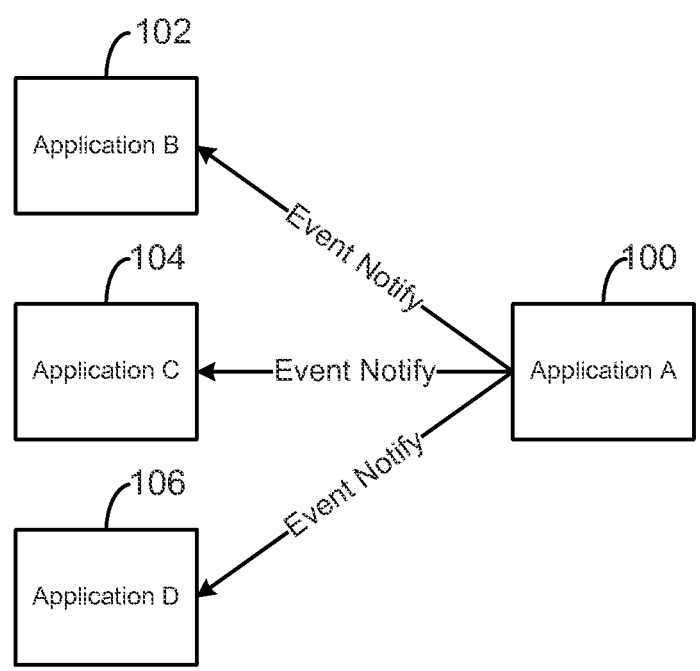
FIG. 3A is a block diagram of a wireless communication device resident application sending event notifications to a plurality of other device-resident applications.

FIG. 3A is a block diagram of a wireless communication device resident application (Application A) 100 sending event notifications to a plurality of other device-resident applications, shown here as UI Application B 102, UI Application C 104, and UI Application D 106. Because they are simultaneously invoked, any of UI Applications 102, 104, 106 may come to the foreground of the display 80 (such as in FIG. 4) depending on when they get the event notification, in the worst case without any arbitration of control of the display, the applications may keep over-riding each other causing UI thrashing. However, once an arbiter 128 is present as is shown in FIG. 3B, the control of the UI relative to multiple simultaneous, and potentially ongoing, requests from a plurality of application, may be determined by the arbiter 128 to at least lessen, and preferably prevent, the UI thrashing.

Figure 3B:
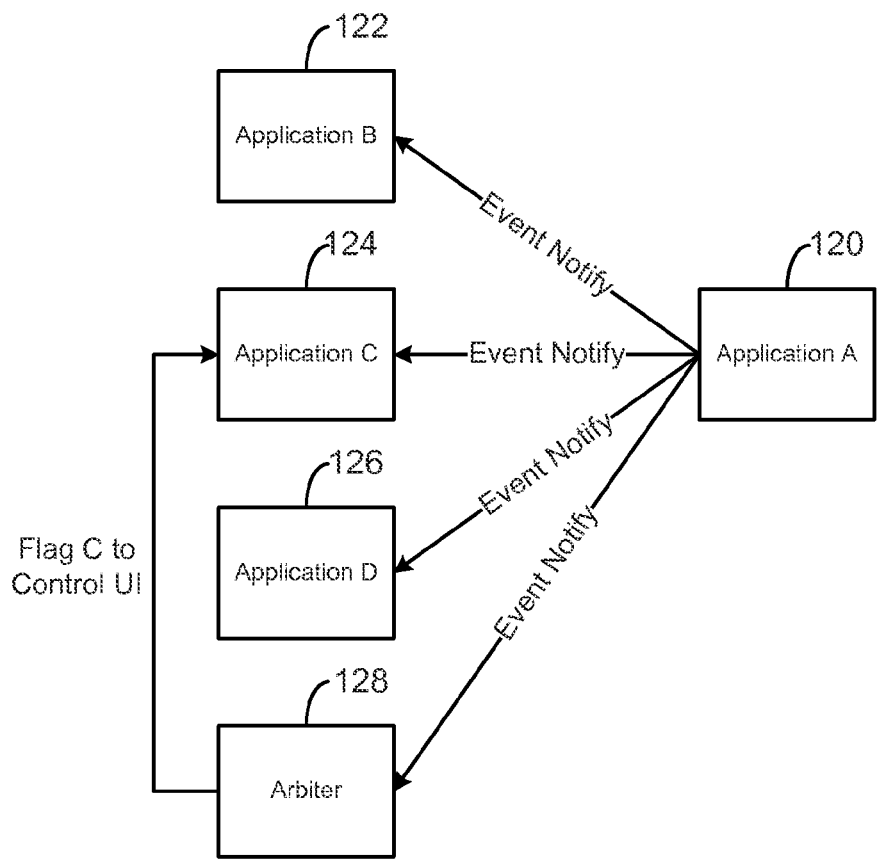
FIG. 3B is a block diagram similar to FIG. 3A, but with an arbiter also receiving an event notice and sending a flag to one of the other applications receiving the notice to indicate that application has priority in controlling the UI.

FIG. 3B is a block diagram similar to FIG. 3A, but embodied with an arbiter 128 also receiving an event notice from UI Application A 120, along with UI Application B 122, UI Application C 124, and UI Application D 126. The arbiter 128 determines which UI application should come to the foreground given the event notification, either based upon a predetermined criteria as is further described herein, or may make the determination at the time of receipt of the event notification. The arbiter 128 may then send a flag to the UI application determined to have priority for controlling the display, shown here as Application C 124, and the resident operating system may allow Application C 124 to control the display until another application with the arbiter flag is received at the operating system. Alternately, each application desiring to come to the foreground may query the arbiter 128 for permission to take the foreground of the display.

Figure 4:
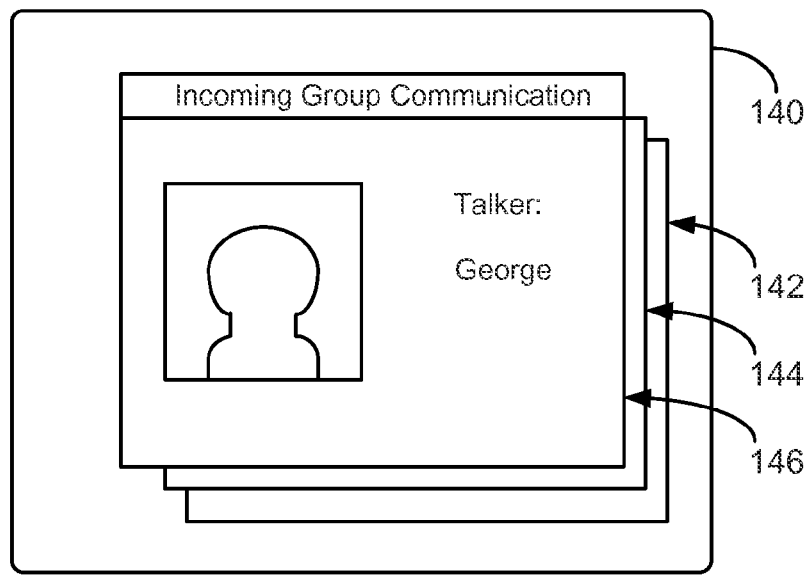
FIG. 4 is a representative illustration of one embodiment of a display of a UI for a wireless communication device with a plurality of resident applications interfaces (APIs) vying for control of the primary display.

FIG. 4 is a representative illustration of one embodiment of a display of a wireless communication device 74 with a plurality of resident UI applications vying for control of, and primary display on, the UI (or UI application) 140. Here, the primary UI 140 is the "Incoming Group Communication" Interface 146, and other interfaces 142 and 144 remain in the background of the UI application. The interfaces shown here are in a "windowed" arrangement, a common graphic interface in user interfaces. The UI control methodology described herein is equally applicable to other UI systems and display schemas, control interfaces for the user to access the computer platform 82.

In one embodiment, the arbiter 128 may utilize a provisioned "priority list" of applications, where Application A 120 has its code changed to allow a list of class IDs to be provisioned, possibly by a network carrier or other entity. This list of class IDs are provisioned in the order of priority of the applications that should be allowed to come to the foreground of the UI 140. For example, one may choose that Application C 124 should have a higher priority over Applications B 122 or D 126 to come to the foreground, and after broadcast of an event to all of the applications, the broadcast also lists the chosen class ID for Application C 124 in the event notify payload. When the applications receive the event notification, they typically check if their class ID matches with what is sent in the payload and if it does, then it should come to the foreground. The arbiter 128 may merely verify the UI control in this embodiment, and does not actually have to grant control as the class ID may be apparent to each application. However, this embodiment does require additional overhead as each resident application may have to be configured to understand the class IDs.

Another embodiment to determine control of the UI 140 is to use a simple algorithm, such as having the last application to come to the foreground to accept an event of a particular event class (alert, call, presence, etc.) is the next application to come to the foreground. In such embodiment, Application A 120 may broadcast the last known foreground application class ID with the event and the receiving application is advised to compare its own class ID to the suggested last known foreground application's class ID, and come to the foreground of the UI 140 only if the two match. However, this may cause "edge case" problems, such as initial thrashing in the case there was no last known foreground application (fresh start-up), or when it is not clear which application was last in control, so a default priority class should still be used.

In another embodiment, a preferred controlling of applications is automatically set. The application itself may register itself as the primary application to come to the foreground to process an event of a particular event class (alert, call, presence, etc.). In such embodiment, the application may retrieve the class ID for the currently-registered application for a particular event class, and make a decision about whether to overwrite the stored class ID with its own. If none is stored, the application may set its own class ID as the primary foreground application for a particular event class. In a further embodiment, there may be a provisioned list based upon the type of event and the activity being invoked, such as provision a list of MIME-types in Application A 120. This set of MIME-types may be provisioned in the order of and Application A 120 may broadcast the events to all the applications with the MIME-type of the highest priority included in the payload of the event notification. When the applications receive this event, they typically see if the included MIME-type matches with what they have been provisioned as and may come to the foreground only if they match. In essence, this embodiment uses MIME-types instead of Class IDs. However, to implement this embodiment, the applications typically co-operate and typically do not come to the foreground if their class ID does not match with what is sent in the event, which requires additional programming in each module.

FIG. 5 is a flowchart of one embodiment of a method for an arbiter 128 determining priority for display 80 control between a plurality of invoked wireless communication device-resident applications. The arbiter 128 receives notice of an event, shown by block 150 (or step 150), and then a determination is made as to whether more than one application invoked, as shown at decision block 152. If no more than one application is invoked at decision block 152, the arbitration process is terminated, as shown at termination block 154. Otherwise, if more than one application is invoked at decision block 152, a decision is then made as to whether there is a predetermined priority for the application, as shown at decision block 156, and if there is a predetermined priority, and then the arbitration terminates, as shown at termination block 162.

Otherwise, if there is not a predetermined priority criteria at decision block 156, the priority of the application to have the display 80 is determined, as shown at block 158 (or step 158), and then a flag is sent to the priority application to control the display 80, as shown at block 160 (or step 160), and the arbitration again terminates as shown at termination block 162. The priority may be determined at block 158 (or step 158) with the methodology as set forth above, or a combination of any of the above methodologies.

FIG. 6 is a flowchart of one embodiment of a method for determining priority for display control between a plurality of invoked wireless communication device-resident applications based upon priority data resident in the applications seeking control of the display 80. A notification event occurs as shown by predefined process block 170, and then a determination is made as to whether more than one application invoked, as shown at decision block 172. If no more than one application is invoked at decision block 172, no arbitration process is required and the process is terminated, as shown at termination block 174. Otherwise, if more than one application is invoked at decision block 172, a decision is then made as to whether there is predetermined priority data present in the applications attempting to control the display 80, as shown at decision block 176, and if there is not predetermined priority data present, the arbitration terminates, as shown at termination block 182. Otherwise, if there is predetermined priority criteria present at decision block 176, the highest priority application to have the display 80 is determined, as shown at block 178 (or step 178), and then a flag is sent to the highest priority application to control the display 80, as shown at block 180 (or step 180), and the process again terminates as shown at termination block 182. Alternately, the priority may be determined at block 178 (or step 178) with the methodology as set forth above, or a combination of any of the above methodologies.

It may therefore be seen that the wireless communication device 74 provides an inventive method of determining which resident application on a computer platform 82 of wireless communication device 74 controls the display 80 thereof, with the user interface 140, at least, appearing on a display 80 of the wireless communication device 74 and through which a user of the wireless communication device 74 interacts with the computer platform 82, which includes displaying the user interface 140 on the display 80 of the wireless communication device 74, the user interface 140 configured to be selectively controlled by one or more applications resident on the computer platform 82. In one embodiment, the method includes receiving a request at an arbiter 128 from one or more of the resident applications to control the display 80, with the arbiter 128 resident on the computer platform 82, and then determining, at the arbiter 128, which application of the one or more resident applications controls the display 80 based upon a predetermined criteria.

In one embodiment, where each of the one or more resident applications include a priority data that determines the priority for the application to control the display 80, the method includes the steps of, after display of the user interface 140, invoking a plurality of the one or more resident applications, as shown in FIG. 3A, and determining which application of the one or more resident applications controls the display 80 based upon the priority data within each invoked application. Such determination may be based upon the use of a class identification that determines the priority for the application to control the display 80, or alternately may be based upon one of the plurality of invoked applications seizing control of the display 80 based upon the priority data. In this embodiment, the priority data ranking may preferably keep display control to the highest priority application to lessen, or preferably prevent, thrashing.

When embodied with an arbiter 128, the step of determining which application of the one or more resident applications controls the display 80 based upon a predetermined criteria is utilizing a priority list for applications attempting to control the display 80. Alternately, determining, at the arbiter 128, which application of the one or more resident applications controls the display 80 based upon a predetermined criteria may be allowing the last application to control the display 80 to again control the display 80. Also, determining, at the arbiter 120, which application of the one or more resident applications controls the display 80 based upon a predetermined criteria may be assigning a class to the one or more applications and determining control is based upon the class of the application. Furthermore, determining, at the arbiter 128, which application of the one or more resident applications controls the display 80 may be allowing the control of the display 80 based upon the type of data being handled in the user interface 140, or may be based upon the type of data being received at the wireless communication interface 92.

The method may further include displaying data to the user of the wireless communication device 74 at the user interface 140, and if the user interface 140 is a display screen, such as interface 140 on the display 80, the method may include displaying graphic information to the user of the wireless communication device 74 at the display 80, such as the APIs 142,144,146. Alternately, where user interface is a control interface for the user to access the computer platform 82, the method may further include displaying graphic information to the user of the wireless communication device 74 at the display screen 80 to control a device function. If the user interface 140 includes one or more user interface applications configured to selectively control the user interface 140, the arbiter 120 may further be configured to selectively allow control of the display 80 to one or more user interface applications, such as the windowed APIs 142,144,146.

As described above with reference to block 160 of FIG. 5 and block 180 of FIG. 6 described above, the wireless communication device may be configured to send flags (or other messages) to priority applications. In various embodiments, the wireless communication device may be configured to transmit messages, flags, or other signals to applications resident on the computer platform indicating that those applications may not control the display (or may not come to the foreground). In particular, the wireless communication device, such as via an arbiter, may transmit suspend messages indicating that an application should operate as an inactive or suspended application in the background of the wireless communication device. For example, after determining the priority application using the operations in block 158 of FIG. 5 or block 178 of FIG. 6, the wireless communication device may transmit a flag to the priority application and a suspend message to every other application executing on the processor of the wireless communication device. In this way, applications may receive the results of arbitration operations by the wireless communication device through such messages or signals, regardless of whether they are the priority application that may control a display (or come to the foreground).

In various embodiments, the wireless communication device may perform operations to modify and/or support arbitration operations described above. In particular, the wireless communication device may perform methods 700, 750, 800, 950, 1050, 1150, 1200, and 1300 as described below. In various embodiments, operations of the methods described below may be performed in combination with or as part of the arbitration operations described above. For example, the wireless communication device, such as via an arbiter, may perform any or all of the operations of the methods 950, 1050, 1150, 1200, or 1300, as described below, after performing the operations in blocks 150-160 of FIG. 5 or blocks 170-180 of FIG. 6.

Further, in various embodiments, the wireless communication device may be configured to perform operations of the various methods described below via an arbiter as described above. For example, the wireless communication device may perform any combination of the operations in any of the methods 700, 750, 800, 950, 1050, 1150, 1200, or 1300 via an arbiter application (or app) executing on the processor of the wireless communication device, or alternatively, via arbiter processes, routines, threads, software, or other instructions that are part of the operating system of the wireless communication device. Accordingly, any operations of the wireless communication device described below may be considered to be executed via such an arbiter.

Figure 7A:
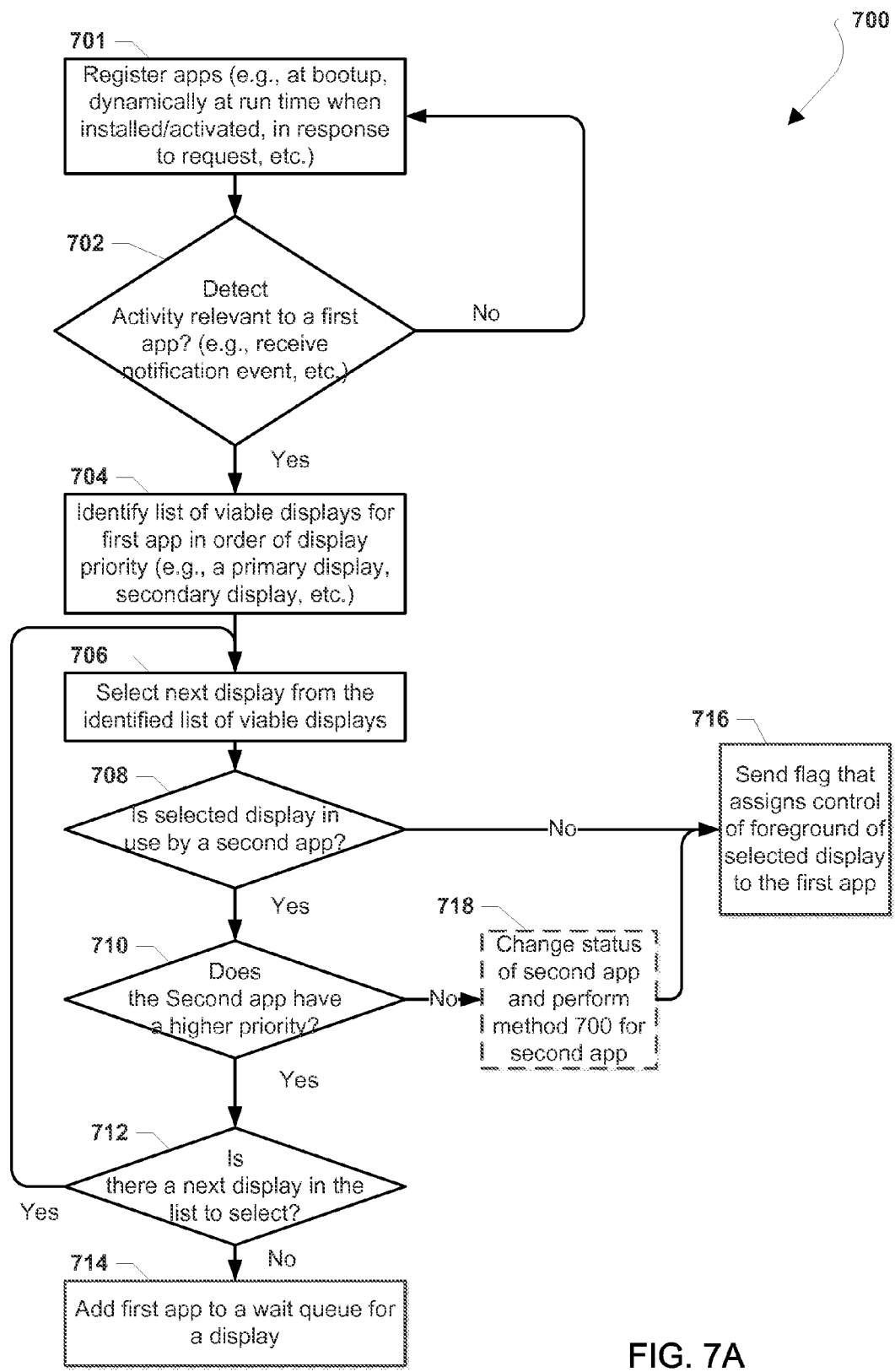
FIGS. 7A-7B are process flow diagrams of embodiment methods for a wireless communication device to assign (or arbitrate) the control of the foreground of multiple displays.
Figure 7B:
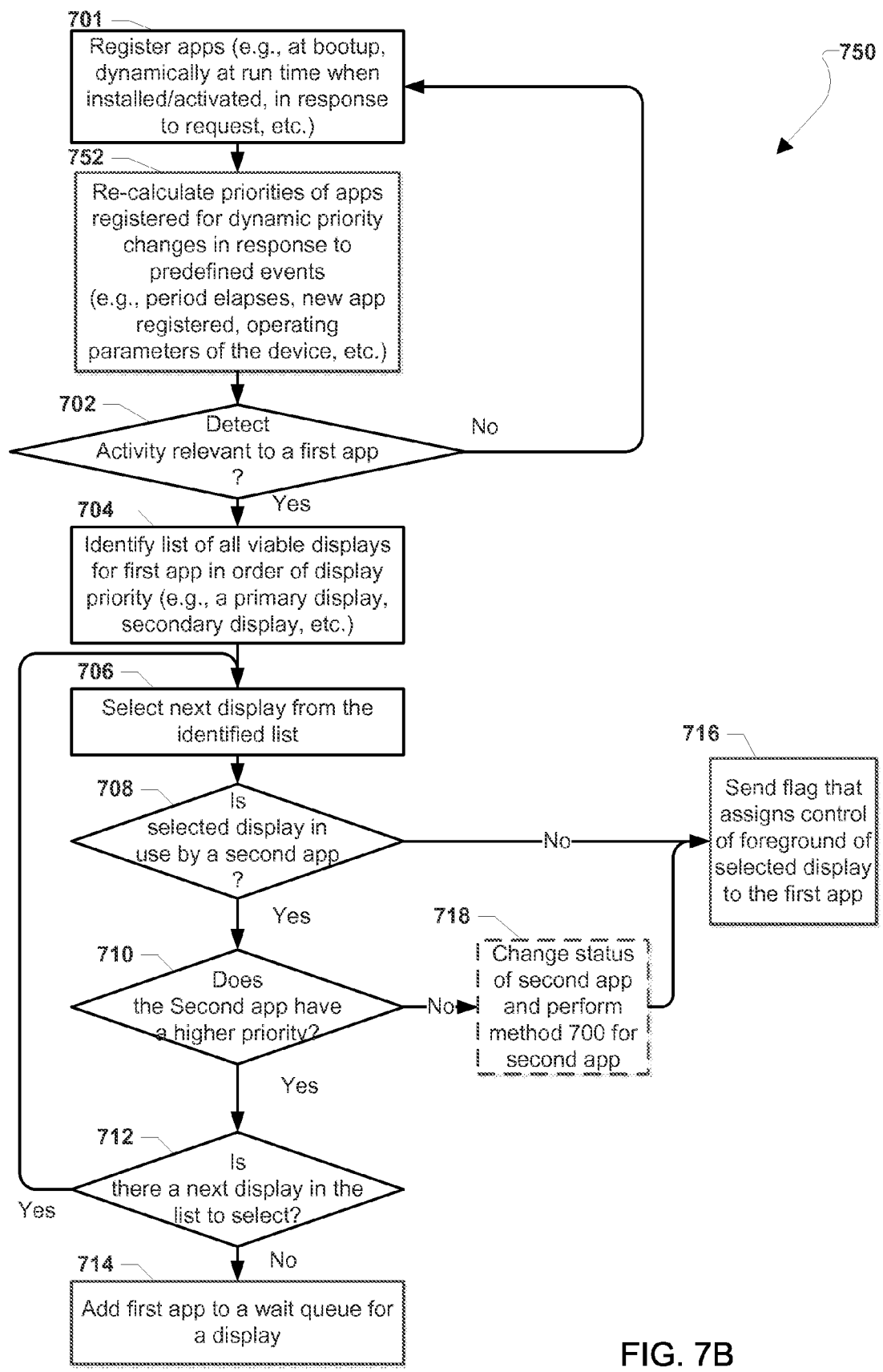
Figure 8:
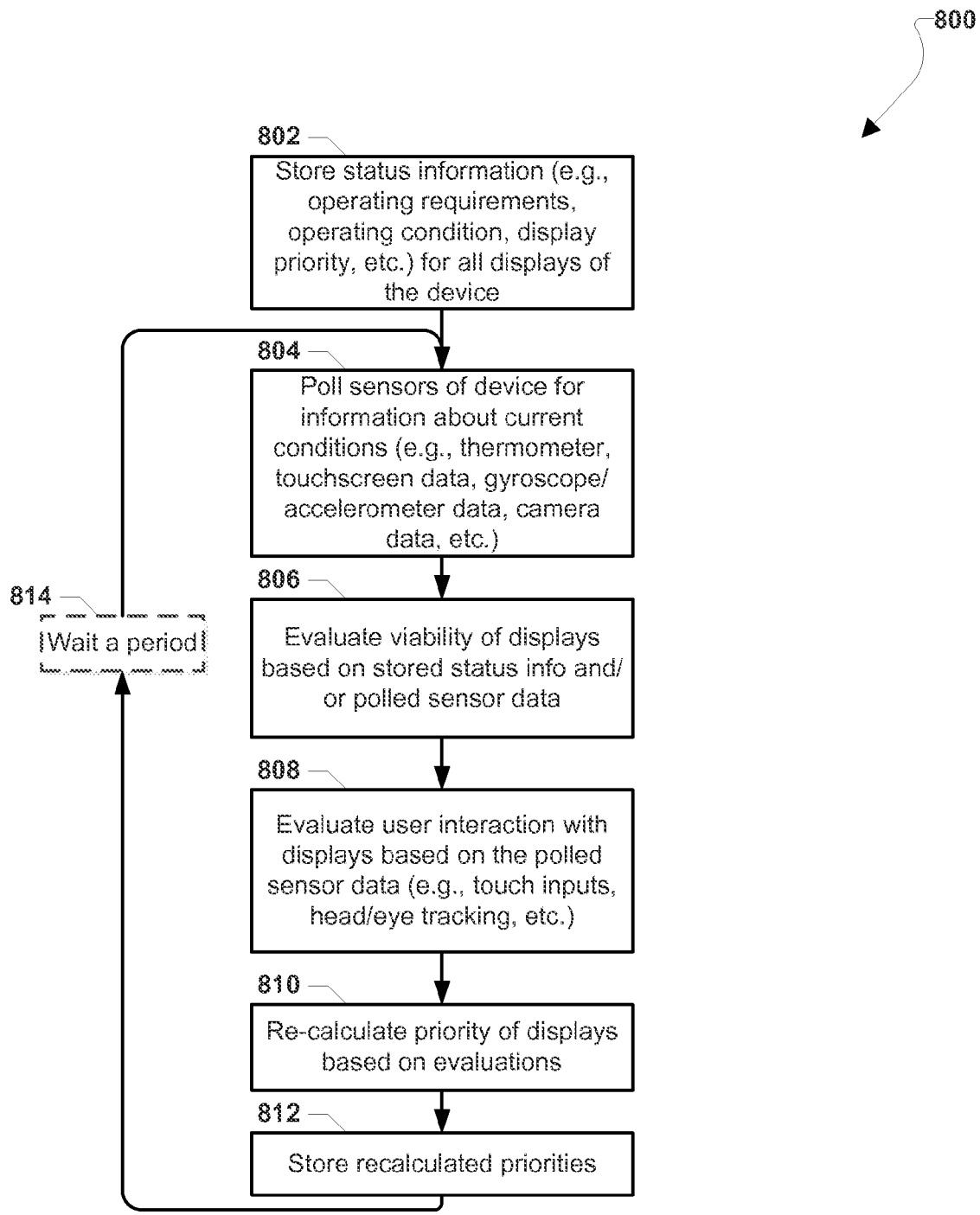
FIG. 8 is a process flow diagram of an embodiment method for a wireless communication device to recalculate priorities of multiple displays.
Figure 14:
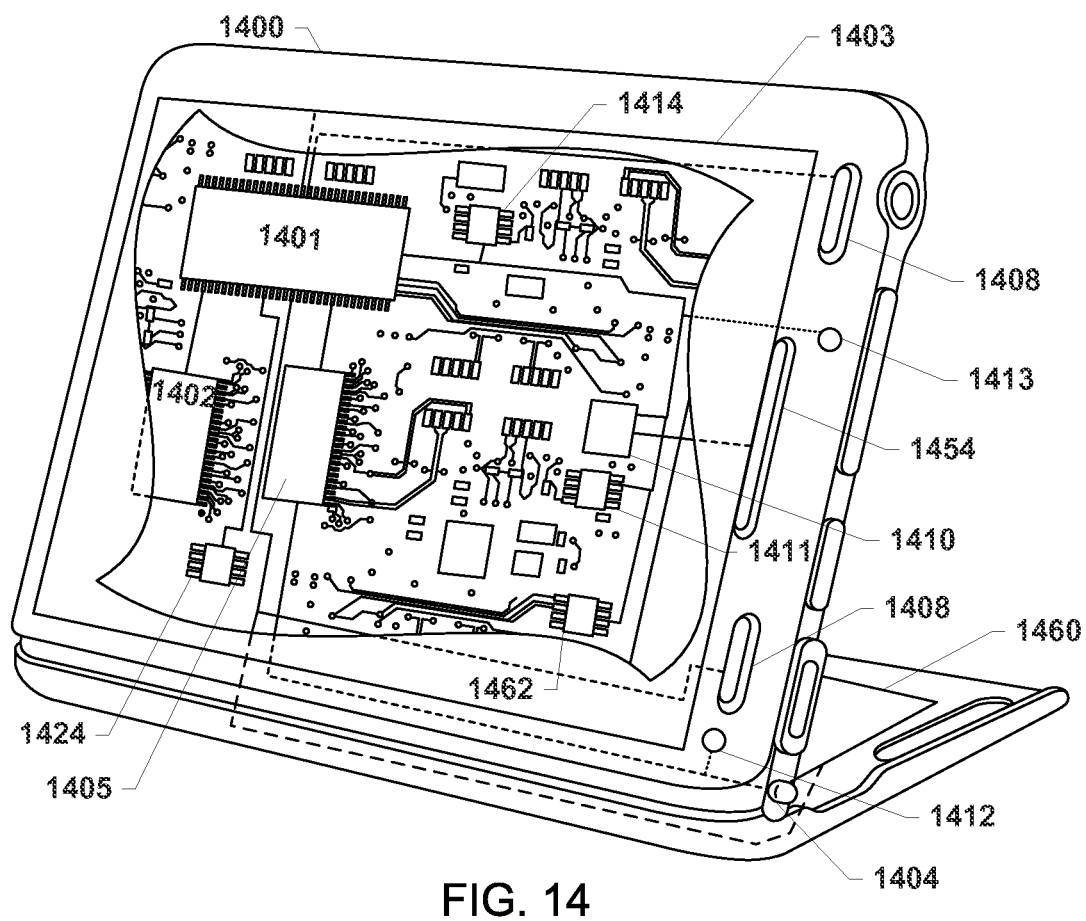
FIG. 14 is a system block diagram of a smartphone wireless communication device suitable for use with various embodiments.

FIGS. 7A-8 illustrate embodiment methods 700, 750, and 800 for the wireless communication device to manage a plurality of displays that may be controlled by applications executing on the processor of the wireless communication device. In various embodiments, the wireless communication device may include, be coupled to, or otherwise be configured to utilize a plurality of displays for rendering information (e.g., images, pictures, and user interface elements) corresponding to applications executing on the processor of the wireless communication device. For example, the wireless communication device may be a clam shell-style mobile device (e.g., cell phone) that includes a plurality of screens, such as a small display for rendering application information when elements (e.g., housing flaps, sides, halves, etc.) of the clam shell-style mobile device is closed and a larger display when the clam shell-style mobile device is opened. As another example, the wireless communication device may include a first touchscreen display on the front side of its housing and a second touchscreen display embedded within the back side of the housing. FIG. 14, discussed in more detail below, illustrates an example of a wireless communication device including a plurality of displays.

In an embodiment, via wireless or wired connections, the wireless communication device may also be connected to or tethered to other displays (e.g., a portable laptop computer, a desktop computer, a plurality of LCD monitors used in combination to render a larger whole image, etc.) or other wireless communication devices having displays (e.g., another smartphone linked to the wireless communication device). In various embodiments, a plurality of displays may refer to different sections, quadrants, or pixel ranges within a single display (e.g., a plurality of monitors used in combination to display a larger whole image such as a billboard). For example, the wireless communication device may divide the real-estate of a single touchscreen display for rendering a plurality of desktops, environments, or foreground applications.

The embodiment methods 700, 750, and 800 described below with reference to FIGS. 7A-8 may be performed by the wireless communication device, such as via an arbiter, to manage how applications resident on the computing platform of the wireless communication device may be permitted to control one of the plurality of displays based on priority information. For example, the wireless communication device may perform the methods 700, 750 via an arbiter application (or app) executing on the processor for managing which other applications executing on the wireless communication device may come to the foreground of a display based upon predetermined criteria.

FIG. 7A illustrates an embodiment method 700 for a wireless communication device to assign (or arbitrate) the control of the foreground of a plurality of displays. In other words, the wireless communication may determine which application may come to the foreground for each of a plurality of displays by comparing the priorities of applications registered with the device. In an embodiment the priority of each application operating on a wireless communication device may be registered with the operating system of the device or with an arbiter. For example, when a higher priority application has control of the foreground of a primary display, the wireless communication device may assign a lower priority application the control of a secondary display. As another example, the wireless communication device may preempt a low-priority application controlling a secondary display in favor of a medium-priority application not important enough to control a primary display.

In block 701, the wireless communication device may register applications, such as by storing registration information that includes descriptive information of applications executing on the wireless communication device. Registered applications may be considered as resident on the computer platform of the wireless communication device. The wireless communication device may register applications at the boot-up of the wireless communication device, in response to receiving registration requests from the applications, or dynamically when the applications are installed, launched, or otherwise activated (e.g., at run time or at an application activation). In an embodiment, applications may be registered by the wireless communication device via the arbiter in response to receiving event notifications.

At the registration of an application resident on the computer platform of the wireless communication device, various registration information may be stored in relation to the application, such as in a data table or database accessible to an arbiter application (or OS process) executing on the wireless communication device. In particular, each registered application may be associated with an identification (e.g., application ID), a default priority (e.g., high, low, critical, etc.), network requirements of the application (e.g., Internet access, a certain required quality of service (QoS), broadcast or multicast needed, global positioning system (GPS) needed, etc.), an indication of whether the application may be dynamically reprioritized as discussed below with reference to FIG. 7B (e.g., an arbiter may dynamically change priority from high to low based on operating conditions, etc.), and an indication of whether the application can be used on a secondary display (e.g., a supplementary touchscreen, etc.).

Additionally, each registered application may be associated with an indication of whether the registered application is capable of running in the background of the wireless communication device (i.e., "background-enabled" or "background-disabled"). For example, when a video call application (e.g., QCHAT®) registers with the wireless communication device (and arbiter) as being "background-enabled," and a video call is subsequently received while a camera application is controlling the foreground (or executing in the foreground) for a display, the wireless communication device via the arbiter may permit the camera application to continue controlling the foreground while the video call application continues running in the background. As another example, when the video call application is registered without the background-enabled indication (i.e., registered with a "background-disabled" indicator), the wireless communication device may pause the camera application and authorize the video call application to take control of the foreground of a display when the video call application is registered with a higher priority level than the camera application. In an embodiment, the wireless communication device may be configured to emit or render tones, music, or other sounds that may indicate a video call status and/or floor control, such as tones that indicate the video call application is conducting a call as a process executing in the background.

The registration information of the various registered applications may be stored as data within data records, bits, variables, descriptive strings, or any other data that the wireless communication device may access to evaluate the applications. In an embodiment, the registration information, such as the indication of whether an application is background-enabled, may be based on user preferences associated with the application, the wireless communication device, and/or the arbiter. For example, user preferences may be set for a particular application that indicate the application may only be rendered on a default/primary screen or that the application may always (or never) be executed as a background process on the wireless communication device.

Returning to FIG. 7A, in determination block 702, the wireless communication device may determine whether an activity relevant to a first application is detected. For example, as described above, the wireless communication device via the arbiter may detect when notification events or other messages are received that may invoke the applications registered with the arbiter. Such detected activities may be predefined events for each individual registered application or may be universal for all applications. Detected activities that may be relevant to the first application may include encountered exceptions, detected changes in stored information associated with registered applications (e.g., a priority change), and/or received event notifications/signals/interrupts/or other messages that are received in response to various conditions, such as the registration of a new application with the arbiter, a change in the operating status (e.g., suspended, active, etc.) or registration information (e.g., priority class, etc.) of an application, an application requests control of the foreground of a display, the loss of control of a display foreground by an application, and an activity state change of a display (e.g., a primary display has become available, etc.).

In an embodiment, the wireless communication device may determine a received message is relevant to the first application based on bits or other indicators that identify the first application and/or the class or priority of the first application. Alternatively, any received message may be relevant to any launched and/or active applications (e.g., applications executing in the background/foreground of the wireless communication device). In various embodiments, the wireless communication device may evaluate every registered application to determine relevancy to any such detected activity (e.g., received message).

If the wireless communication device does not detect an activity relevant to the first application (i.e., determination block 702="No"), the wireless communication device may continue with the operations for registering applications in block 701. For example, the wireless communication device may continually or periodically register applications and monitor for notification events. If the wireless communication device does detect an activity relevant to the first application (i.e., determination block 702="Yes"), in block 704 the wireless communication device may identify (or order) a list of all viable displays for the first application in order of display priority. For example, the wireless communication device may identify all touchscreens, LCD screens, and other display units associated with the wireless communication device that are functioning properly (i.e., not broken, being repaired, etc.) and that are currently in-use. In other words, the identified list of viable displays may be a list of all the possible displays on which the first application may come to the foreground.

In an embodiment, the wireless communication device may identify the list based on registration information associated with the first application. For example, if the registration information of the first application indicates that the first application does not support multiple displays, the wireless communication device may identify a list that includes only the default or primary display of the device. As another example, the wireless communication device may evaluate the registration information of the first application to find a preferred display priority and may identify the list accordingly. In another embodiment, the wireless communication device may identify the list of viable displays by evaluating the power required to use a display. In particular, the wireless communication device may evaluate the available battery power of the device to determine whether a de-activated secondary display may be activated (or energized) for the first application to control. The wireless communication device may estimate the power consumption of such a secondary display with the first application and may compare the estimated consumption to a threshold value to determine whether it is feasible to activate the secondary display.

The display order of the list of viable displays may be based on predefined, stored information related to the various displays (e.g., a database with information describing the priority classifications of display units), user preferences, activity (e.g., how often the display is used), and usefulness to the first application. For example, the list of viable displays may be in order from default (or primary) touchscreen to secondary displays. As another example, the list of viable displays may be presented in descending order of resolution or render quality (e.g., HD, SD, black-and-white, etc.). As yet another example, the list may order the displays in order of best able to render the particular type of data associated with the first applications (e.g., video, text, etc.). In various embodiments, the identified list for the first application may be different than the identified list for other registered applications. For example, the wireless communication device may identify that an OLED or LED screen has a highest display priority for the first application (e.g., a video game) based on the first application's registered information, but may identify a touchscreen as the highest display priority for a second application (e.g., a picture editor).

In block 706, the wireless communication device may select a next display from the identified list of viable displays. For the first time the wireless communication device performs the operations in block 706, the next display may be the first display in the identified list of viable displays (i.e., the display having the highest display priority for the first application). For example, the wireless communication device may first select the default (or primary) display to evaluate for the first application. In determination block 708, the wireless communication device may determine whether the selected display is in use by a second application. If the selected display is not in use by the second application (i.e., determination block 708="No"), in block 716 the wireless communication device may send a flag (or other signal) that assigns control of the foreground of the selected display to the first application.

If the selected display is in use by the second application (i.e., determination block 708="Yes"), in determination block 710, the wireless communication device may determine whether the second application has a higher priority than the first application. The wireless communication device may compare the registration information of the first and second applications, such as by comparing the priority class or other characteristics to identify the application having the higher priority. The wireless communication device may perform operations similar to those described above with reference to blocks 158 and/or 178 of FIGS. 5-6 to determine which application has the higher priority.

If the second application does not have a higher priority (i.e., determination block 710="No"), in optional block 718 the wireless communication device may change the status of the second application, such as by storing a bit indicating the second application is being removed from control of the foreground of the selected display. In an embodiment, the change of status may be accompanied by the wireless communication device sending a message or signal indicating the status change of the second application (e.g., a suspend message) and thus triggering the performance of the method 700 to reassign the second application to another display, if possible. The wireless communication device may then continue with the operations in block 716.

If the second application has a higher priority (i.e., determination block 710="Yes"), in determination block 712 the wireless communication device may determine whether there is a next display in the identified list of viable displays to select. In other words, the wireless communication device may determine whether to perform the operations of block 706 in another iteration to assign the first application to the display with the next highest display priority in the identified list of viable displays. If there is not a next display in the identified list of viable displays to select (i.e., determination block 712="No"), in block 714 the wireless communication device may add the first application to a wait queue for a display. For example, the first application may be suspended until the primary display, or any display in the identified list of viable displays, becomes available. As described above, the wireless communication device may receive a message or signal when displays become available, and in response, may perform operations of the method 700 to assign the first application to a display.

In an embodiment, the wireless communication device may perform the method 700 to successively assign an application to different displays in its associated list of ordered displays. In other words, in response to receiving a message or signal indicating a certain display (e.g., default, primary, high priority) has become available, the wireless communication device may perform the operations in the method 700 to determine whether an application controlling a secondary display may be re-assigned to the certain display. For example, when a higher priority second application is terminated and surrenders control of a front-facing display (i.e., the default or primary display), the wireless communication device may determine whether a lower priority first application previously assigned to a secondary display on the backside of the housing of the wireless communication device may be re-assigned to the front-facing display.

FIG. 7B illustrates an embodiment method 750 for a wireless communication device to assign (or arbitrate) the control of the foreground of a plurality of displays. The method 750 is similar to the method 700 described above, except that the method 750 includes operations for updating (or re-calculating) the priorities of the various applications resident on the wireless communication device and registered to be managed by the arbiter. In block 701, the wireless communication device may register applications, such as by storing descriptive information of applications executing on the wireless communication device.

In block 752, the wireless communication device may re-calculate priorities (or perform re-prioritization) of applications registered for dynamic priority changes in response to predefined events. As described above, the registration information stored by the wireless communication device at the registration of the various applications may include indications of whether the applications may be dynamically reprioritized. In other words, the registration information may indicate whether an application has opted-in to being re-prioritized by the wireless communication device, such as via an arbiter application or OS routine. Certain applications, such as emergency call applications, may have static priorities and may not be registered to permit dynamic re-prioritization by the wireless communication device.

In various embodiments, the predefined events may be stored in data generally accessible by the wireless communication device (e.g., in memory associated with the arbiter application), or alternatively stored within registration information of the individual registered applications. The predefined events may include conditions, timers, messages (or received message types), or other circumstances that may trigger the re-calculation of priority for particular applications. For example, the registration information for a certain application may indicate that the wireless communication device should re-calculate the certain application's priority once every time period (e.g., millisecond(s), second(s), minute(s), etc.) and/or every certain number of processor clock cycles (or signals). As another example, the wireless communication device may perform re-prioritization operations for the certain application based on detecting the registration or launching of an application. In an embodiment, the wireless communication device may perform re-prioritization operations for an application based on detected user input, such as taps on a touchscreen or text typing inputs corresponding to an address book application.

In another embodiment, the wireless communication device may perform re-prioritization operations for an application based on changes in the operating parameters of the device. For example, an application may be re-prioritized in response to the wireless communication device detecting a change in network connectivity, such as the wireless communication device losing a connection to a wide area network (WAN), gaining a connection to the WAN, detecting cellular network service activity changes, and/or connecting to a certain access point. As another example, an application may be re-prioritized in response to the wireless communication device receiving a short-range wireless signal (e.g., Bluetooth, etc.) and/or detecting a change in available power (e.g., available battery life below a predefined threshold, connected to a power source, etc.). In another embodiment, the wireless communication device may re-calculate priorities of applications in response to detecting status changes in the registered applications (e.g., suspended, activated, removed from control of a display, etc.). For example, the wireless communication device may lower the priority of a typically high priority video call application when the application has an idle screen.

As an example to illustrate an embodiment: the wireless communication device may execute on its processor two applications registered for dynamic re-prioritization: a video call application that requires a network connection and that may be initially registered with a high priority and a camera application that does not require a network connection and may be initially registered with a low priority. When the video call application is launched, the wireless communication device via the arbiter may detect that there is no cellular network connection available (i.e., no coverage), and thus the video call application may be temporarily inoperable. In such a condition, the wireless communication device via the arbiter may dynamically re-prioritize the camera application to have a higher priority than the video call application to avoid a situation where the camera may lose control of the foreground of the wireless communication device's display.

As another example to illustrate an embodiment, the wireless communication device may execute on its processor two applications registered for dynamic re-prioritization: a video call application that may be initially registered with a high priority; and an address book application that may be initially registered with a low priority. The wireless communication device may detect user inputs when the address book application is controlling the foreground for a display and, as a result, may increase the priority of the address book application to avoid interrupting the input even if the video call application is launched or receives an incoming call.

The recalculation (or reprioritization) operations for the applications may use various weighting schemes, rule sets, balancing factors, models, equations, and other considerations for determining new priority values for each application. Further, the reprioritization of one application may trigger the wireless communication device to re-calculate the priority of another application. For example, in response to re-calculating a first application as having the highest priority, the wireless communication device (via the arbiter) may re-calculate the priority of a second application that previously had the highest priority.

Returning to FIG. 7B, in determination block 702, the wireless communication device may determine whether an activity relevant to a first application is detected. In particular, the wireless communication device may determine whether a change in priority has occurred for registered applications. For example, if the first application is in a wait queue for a display, the wireless communication device may determine whether any applications having a higher priority than the first application have been re-prioritized. As another example, if the first application is in a wait queue for a display or if the first application is not currently in control of its preferred display, the wireless communication device may determine whether any of the displays of the device have become available, especially a display that is preferable for the first application based on its registration information.

If the wireless communication device does not detect an activity relevant to the first application (i.e., determination block 702="No"), the wireless communication device may continue with the operations for registering applications in block 701. If the wireless communication device does detect an activity relevant to the first application (i.e., determination block 702="Yes"), in block 704 the wireless communication device may identify a list of all viable displays for the first application in order of display priority. In block 706, the wireless communication device may select a next display from the identified list of all viable displays. In determination block 708, the wireless communication device may determine whether the selected display is in use by a second application. If the selected display is not in use by the second application (i.e., determination block 708="No"), in block 716 the wireless communication device may send a flag that assigns control of the foreground of the selected display to the first application. If the selected display is in use by the second application (i.e., determination block 708="Yes"), in determination block 710, the wireless communication device may determine whether the second application has a higher priority than the first application. If the second application does not have a higher priority (i.e., determination block 710="No"), in optional block 718 the wireless communication device may change the status of the second application, and may then continue with the operations in block 716. If the second application has a higher priority (i.e., determination block 710="Yes"), in determination block 712 the wireless communication device may determine whether there is a next display in the list of all viable displays to select. If there is not a next display in the list of all viable displays to select (i.e., determination block 712="No"), in block 714 the wireless communication device may add the first application to a wait queue for a display.

FIG. 8 illustrates an embodiment method 800 for a wireless communication device to recalculate priorities of multiple displays. Similar to the re-calculation of priorities for registered applications described above with reference to FIG. 7B, the wireless communication device may be configured to update priority information of the various displays of the device that may be controlled by registered applications. For example, based on facial recognition data using camera data that indicates a child is using a default (or highest priority) screen on the left side of a device to view a cartoon and a father is using a secondary screen on the right side of the device to do work, the wireless communication device (via an arbiter) may reprioritize the secondary screen on the right side to be the new default (or highest priority) display. As another example, based on stored information indicating a default screen is broken or malfunctioning, the wireless communication device may reprioritize a secondary screen to be the default screen until the former default is repaired. Performing method 800, the wireless communication device may direct applications to control more appropriate displays based on context and/or use.

In block 802, the wireless communication device may store status information for all displays of the device. For example, the wireless communication device may store within a database or system variables indicators or other descriptive information that indicates the operating requirements (e.g., power consumption parameters, type of data that may be rendered, type of data that may best be rendered, etc.), display priority or rank (e.g., default, secondary, etc.), dimensions (or viewable area), and operating conditions or functionality indications (e.g., broken, malfunctioning, nominal, etc.) related to each of the plurality of displays that are connected to or otherwise controlled by the wireless communication device. In an embodiment, the status information may be ordered by display priority, such as by being ordered in ascending order of user preference or rank. In various embodiments, the wireless communication device may store status information for each of the plurality of displays for each of the registered applications. For example, the wireless communication device may store individual ranked lists for each of the displays relative to the each of the plurality of applications resident on the computer platform of the wireless communication device.

In block 804, the wireless communication device may poll sensors of the device for information about current conditions. The wireless communication device may include various sensors, such as cameras, microphones, thermistors, accelerometers, gyroscopes, and touch-sensing surfaces. The wireless communication device may gather sensor data that indicates environments or usage circumstances that may be used to evaluate the viability of displays of the device and how the user of the device is interacting with the device. For example, the wireless communication device may evaluate accelerometer sensor data to identify circumstantial information useful in prioritizing the displays. Using the sensor data, the wireless communication device may evaluate various conditions relevant to using the displays, such as ambient temperature based on thermistor sensor data, ambient brightness based on camera data, current device movement or motion based on accelerometer/gyroscope sensor data, device inclination based on gyroscope sensor data, a device altitude based on GPS data, user inputs based on touchscreen inputs, and the identity of the current user based on camera data (e.g., imagery data recorded of current user's face) or microphone data (e.g., audio data recorded of current user's voice).

In block 806, the wireless communication device may evaluate the viability of displays based on the stored status information and/or the polled sensor data. For example, based on the stored status information for a certain LCD screen, the wireless communication device may assess whether that screen is power-hungry (or require a significant amount of battery power), is operating at a high temperature, has certain resolution capabilities (e.g., standard definition (SD), high definition (HD), etc.), has touch-sensitive functionalities, and/or is currently functioning properly (e.g., broken, etc.). The wireless communication device may compare the stored status information of the various displays to current conditions, such as time of day. Further, the wireless communication device may compare the stored status information of the various displays to the sensor data, such as by comparing stored information indicating the luminous output capabilities of a display to the ambient brightness to identify how well a user might see applications rendered on the display. For example, the wireless communication device may compare the current motion data from accelerometers to the viewable area of a screen to identify how useful the screen may be when rendering particular applications while the user is walking/running/sitting.

In block 808, the wireless communication device may evaluate user interactions with the displays based on the polled sensor data. For example, by evaluating detected touch inputs on a touch-sensitive screen, the wireless communication device may estimate the user's activity related to the various screens. The wireless communication device may determine a currently most-used or most popular display based on detected user inputs. The wireless communication device may also perform eye tracking and/or head tracking using camera data to identify particular screens that the user is looking at more often. For example, the wireless communication device may determine user interaction information that indicates whether a user is looking at any of the plurality of displays based on eye tracking, whether the user is looking at any of the plurality of displays based on head tracking, and/or whether the user is touching any of the plurality of displays. In an embodiment, the wireless communication device may evaluate gyroscope sensor data to identify how the device is being held in order to determine its current use. For example, if the sensor data indicates the device is being held up, the wireless communication device may assess the likelihood that the user is looking at a front-facing screen as opposed to a screen on the back of the device. In various embodiments, the user interactions with the device may be interpreted over a period of time, and thus the wireless communication device may utilize sensor data gathered or recorded and stored in the device during that time.

In block 810, the wireless communication device may recalculate the priority of the displays based on the evaluations, such as the evaluated viability of displays and/or the evaluated user interaction with displays. For example, based on the evaluation of the increased user interactions with a certain display over a period of time, the wireless communication device may increase the priority of the certain display (e.g., make the certain display the default or priority display). The recalculation (or reprioritization) operations for the displays may use various weighting schemes, rule sets, balancing factors, models, equations, and other considerations for determining new priority values for each display. For example, based on erratic motion sensor data, the wireless communication device may reprioritize a large screen to be the default display so that applications rendered on the large screen are easier to see when the user is jogging. As another example, the wireless communication device may reprioritize a default screen to have the lowest priority among the plurality of displays based on status information indicating that the screen requires more power than the device can sustain given the charge remaining on the device's battery.

In an embodiment, the priority of one or more of the display in the plurality of displays may be updated or otherwise changed in response to the change of a display priority. For example, in response to reprioritizing a first display as the default (or most important) display, the wireless communication device may necessarily reduce the priority of (or reprioritize) a second display that was the default display. In block 812, the wireless communication device may store the recalculated priorities of the displays, such as by updating data records associated with the displays within a database, system variables, or other data that may be accessible to the arbiter. In optional block 814, the wireless communication device may wait a period, such as a predefined number of seconds, minutes, etc, and then repeat the operations beginning in block 804.

In an embodiment, the method 800 may be performed by the wireless communication device during the operations in block 704 described above with reference to FIGS. 7A-7B. For example, the wireless communication device may be configured to reprioritize the displays of the device for a particular registered application based on the evaluations described above, plus the registration information associated with the particular application (e.g., the type of data to be rendered for the application, etc.). In other words, each registered application may be associated with a display priority list for all displays of the wireless communication device that may be reprioritized.

FIGS. 9A-12 illustrate embodiments for the wireless communication device to disambiguate user inputs coinciding with a plurality of applications controlling a display. Without the benefits of the various embodiments, successor applications may interrupt predecessor application operations when the wireless communication device permits the successor applications to gain control over the foreground of a display. In particular, when the wireless communication device is receiving user inputs (e.g., typed text, speech commands, visual gestures, etc.) associated with a first application and a second application "pops up" to gain control of the display, the user inputs could be applied to the second application against the intention of the user if the various embodiments are not active. For example, while receiving text input in an email client, the wireless communication device may permit a video call application to come to the foreground in response to receiving an unexpected text, moving the text input focus to the video call application. As another example, a wireless communication device may launch a video application and then may give control of the foreground to an email client while the video application loads; however, the video application may unexpectedly pop-up in the middle of the wireless communication device receiving a word of text input for the email client. As yet another example, voice-to-text (or voice command) input for a video call application may be unintentionally applied to a calendar application that pop-ups on the display based on the occurrence of a scheduled event. As users may not know when applications may pop-up and gain control of a display, there may be good reason to assume user inputs received very close in time to a new application gaining control of the display (e.g., within a half-second, etc.) should be applied to a predecessor application.

Figure 9A:
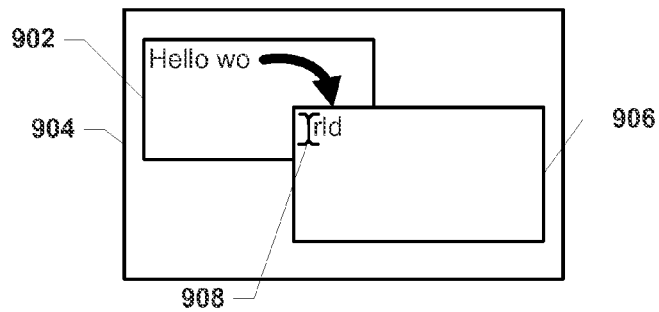
FIG. 9A is a representative illustration of a display of a user interface for a wireless communication device with a second application coming to the foreground as the device receives user input.

FIG. 9A illustrates a display 904 of a wireless communication device rendering a first user interface 902 for a first application with a second user interface 906 for a second application coming to the foreground as the device receives user input intended for the first application. As described above, the second application may come to the foreground (i.e., gain control of the display) in response to the wireless communication device receiving an incoming event or a timed-event, or when a process is just completing (e.g., an application loading in background finally launches).

As an exemplary illustration: a user of the wireless communication device may intend to enter the text input "Hello world" into the first user interface 902 of the first application. The first user interface 902 is shown to be associated with a first input text "Hello wo," such as an input typed into the wireless communication device via a touchpad or soft keyboard. The first user interface 902 may be associated with the first input text as the first application was controlling the foreground of the wireless communication device at the time the first input text was received (or typed in). The second user interface 906 is shown to be associated with a second input text "rld," and further is shown to have the focus of the input for the wireless communication device (shown in the FIG. 9A by the cursor element 908). The second user interface 906 may be associated with the second input text as the second application was controlling the foreground of the wireless communication device at the time the second input text was received (or typed in). In other words, in between the wireless communication device receiving the first input text "Hello wo" and the second input text "rld," the second application came to the foreground of the wireless communication device and the focus changed from the first application.

Figure 9B:
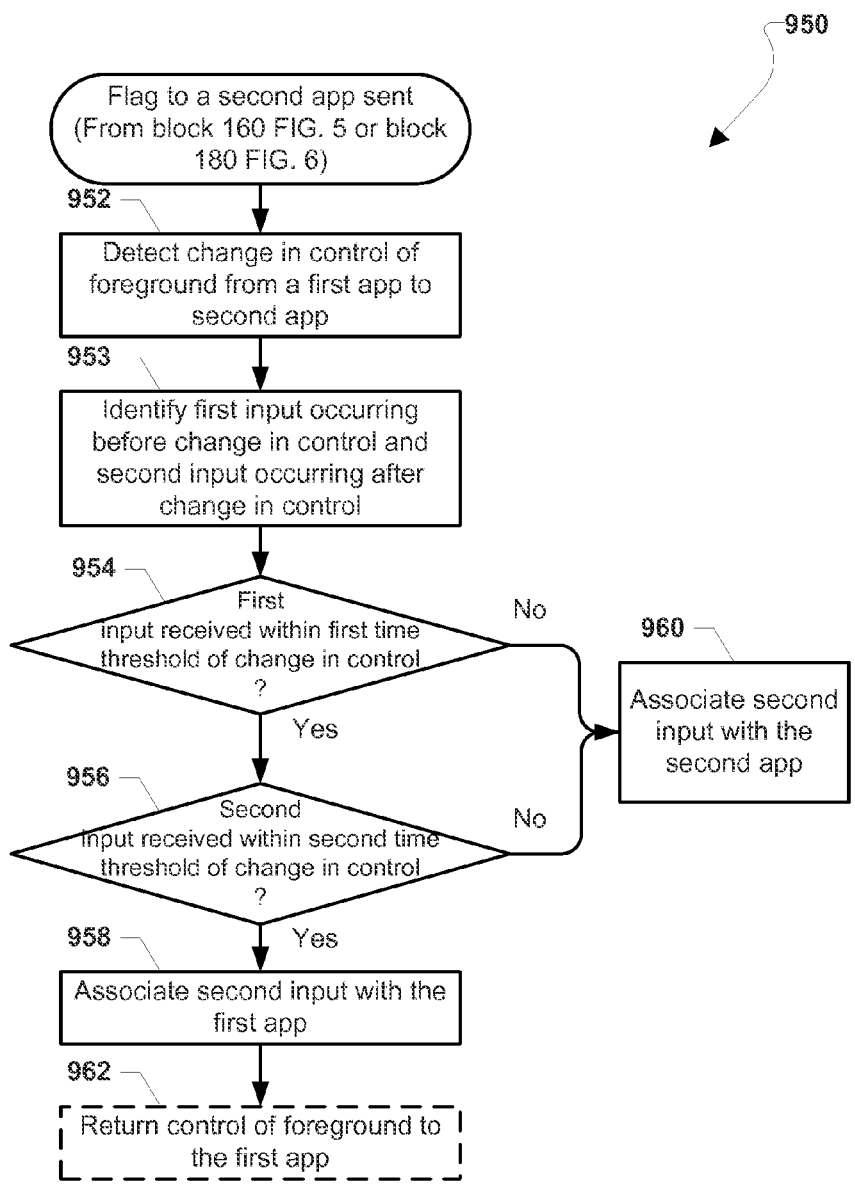
FIG. 9B is a process flow diagram of an embodiment method for a wireless communication device to associate received user input with a first or second application based on timing information.

FIG. 9B illustrates an embodiment method 950 for a wireless communication device to associate received user inputs with a first or second application based on timing information. For example, the wireless communication device via the arbiter may perform operations to infer the intended target application for received user inputs by evaluating the various times inputs were received and application focus was shifted. In various embodiments, the method 950 may be performed by the wireless communication device as part of the methods described above with reference to FIGS. 5-6. For example, the wireless communication device via the arbiter may perform the method 950 after performing the operations in block 160 of FIG. 5 or block 180 of FIG. 6.

In block 952, the wireless communication device may detect a change in control of the foreground (or a display) from a first application to a second application. For example, the second application may be a video call application to which the arbiter sent the flag with the operations in block 160 of FIG. 5 or block 180 of FIG. 6. The wireless communication device may also identify and store a time associated with the change in control, such as the half-second of the day at which the second application gained control of the foreground. In various embodiments, the wireless communication device may detect the change by evaluating an operating system table, system variable, or other stored information that indicates the current controlling application as well as the time at which control was gained by the controlling application. In an embodiment, the change in control may be detected based on an interrupt or other signal generated in response to the second application gaining control of the foreground. In an embodiment, the change in control may be detected by evaluating a change in a focus indicator (e.g., focus may be moved from one user interface to another for the purpose of inserting user inputs).

In block 953, the wireless communication device may identify a first input occurring before the change in control and a second input occurring after the change in control. The wireless communication device may evaluate an input buffer, such as a temporary storage location in memory that stores the user input values or actions received by the device over a certain period of time, and identify the first and second inputs based on time of receipt information associated with the buffered inputs. For example, the received user inputs may be stored in association with the times of receipt and/or the application in control of the foreground (i.e., having focus) at the time of receipt of the user inputs. Alternatively, the wireless communication may be configured to use various buffers, arrays, or other data structures for different applications. For example, the wireless communication device may identify the first input as the data stored in a first buffer associated with the previous application to control the foreground and may identify the second input as the data stored in a second buffer associated with the current application to control the foreground. In an embodiment, the first input may only be a segment of a user input (e.g., a most recently received segment) that was received prior to the change in control. For example, the first input may be identified as the text input received before the change in control but after a punctuation mark, a space symbol, a return carriage, or other logical divider within a stream of text. In an embodiment, the wireless communication device may utilize detected input events, such as mouse click, touch, or keyboard events, to identify the time of receiving the first and second inputs. In various embodiments, the user inputs may be touch inputs (e.g., presses, swipes, taps, etc.), text inputs (e.g., typed words, etc.), spoken or verbal inputs (e.g., voice commands, etc.), and/or visual inputs (e.g., gestures, etc.).

The second application may not be considered to be interrupting an on-going user input when the second application gains control of the foreground a certain time after the user entered inputs (e.g., text, voice, etc.). Thus, in determination block 954, the wireless communication device may determine whether the first input was received within a first time threshold of the change in control. In other words, when the time in between receiving the first input and the detected change in control exceeds the first time threshold, then the second input may not likely be a continuation of the first input (i.e., it may be inferred that the user intended the second input to be associated with the second application). The first time threshold may be a predefined value, such as a half-second(s), and/or may be based on user preferences. In an embodiment, the wireless communication device may compare the predefined first time threshold value to a calculated value representing the difference in the time of receipt associated with the identified first input with the time of the change in control. If the first input was received outside of the first time threshold of the change in control (i.e., determination block 954="No"), in block 960 the wireless communication device may associate the second input with the second application. For example, when the first input was received a number of seconds (e.g., thirty seconds, etc.) prior to the second application gaining control of the foreground, the wireless communication device may interpret the second input to be intended for the second application.

If the first input was received within of the first time threshold of the change in control (i.e., determination block 954="Yes"), in determination block 956, the wireless communication device may determine whether the second input occurred within a second time threshold of the change in control. In other words, when the time in between the detected change of control and receiving the second input exceeds the second time threshold, then the second input may be presumed not to be a continuation of the first input (i.e., it may be inferred that the user intended the second input to be associated with the second application). The operations in the determination block 956 may be similar to those described above with reference to determination block 954, except that the wireless communication device may use the time of receiving the second input instead of the time of receiving the first to calculate the time window to compare to the predefined second threshold value. In various embodiments, the first time threshold and the second time threshold may be the same value.

If the second input was received outside of the second time threshold (i.e., determination block 956="No"), in block 960, the wireless communication device may associate the second input with the second application. However, if the second input was received within the second time threshold (i.e., determination block 956="Yes"), in block 958, the wireless communication device may associate the second input with the first application. In other words, the wireless communication may determine that user input for the first application was interrupted by the second application taking control of the foreground, and so the second input may be associated with the first application. In optional block 962, the wireless communication device may return control of the foreground to the first application. For example, via the arbiter, the wireless communication device may send a flag to the first application indicating that has priority to control the foreground based on the determination that user input was interrupted.

In various embodiments, instead of performing the operations in determination blocks 954-956, the wireless communication device may be configured to simply compare the time between receiving the first and second inputs with a predefined threshold value. For example, once the wireless communication device determines that the first input is received before the change in control and the second input was received after the change in control, the wireless communication device may only need to compare the measured time between the two receipts to determine whether the second input may be associated with the second application.

In various embodiments, the wireless communication device may utilize various factors, rule sets, balancing tests, weighting schemes, and other logic for determining whether received user inputs (e.g., voice, text, gestures, etc.) are intended for the first or second application. For example, in addition to evaluating time measurements as described above, the wireless communication device may also evaluate no-op touch events and the location of detected touch inputs to determine whether the user intended to change the focus of the foreground of the device corresponding to received user inputs (e.g., a stream of typed text). As an illustration, the wireless communication device may identify whether a touch input was detected coincident to the second application text box to determine whether a focus change relative to the second input was intentional.

Figure 10A:
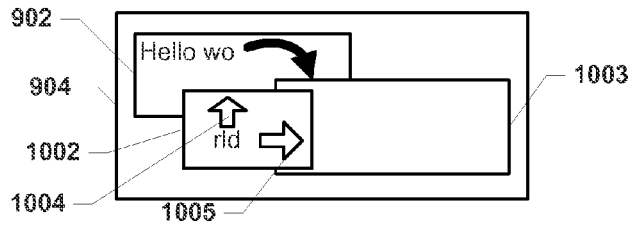
FIG. 10A is a representative illustration of a display of a user interface for a wireless communication device rendering a prompt dialog box in response to a second application coming to the foreground as the device receives user input.

Another technique for disambiguating user inputs intended for a first and a second application may include generating a prompt dialog box that requests or invites additional user input (or selection input). FIG. 10A illustrates an embodiment display 904 of a wireless communication device rendering a first user interface 902 for a first application, a second user interface 1003 for a second application coming to the foreground, and a prompt dialog box 1002 inviting a selection input for disambiguating input.

As an example, a user of the wireless communication device may intend to enter the text input "Hello world" into the first user interface 902 of the first application. The first user interface 902 is shown to be associated with a first input text "Hello wo," such as an input typed into the wireless communication device via a touchpad or soft keyboard. The first user interface 902 may be associated with the first input text as the first application was controlling the foreground of the wireless communication device at the time the first input text was received (or typed in).

The second user interface 1003 is shown in FIG. 10A to not have any associated input. However, the prompt dialog box 1002 may include a second input text "rld" as well as arrow UI elements 1004, 1005 prompting the user to pick the application that should be associated with the second input text. In particular, the first arrow UI element 1004 may be configured to associate the second input text with the first application when selected and the second arrow UI element 1005 may be configured to associate the second input text with the second application when selected.

Figure 10B:
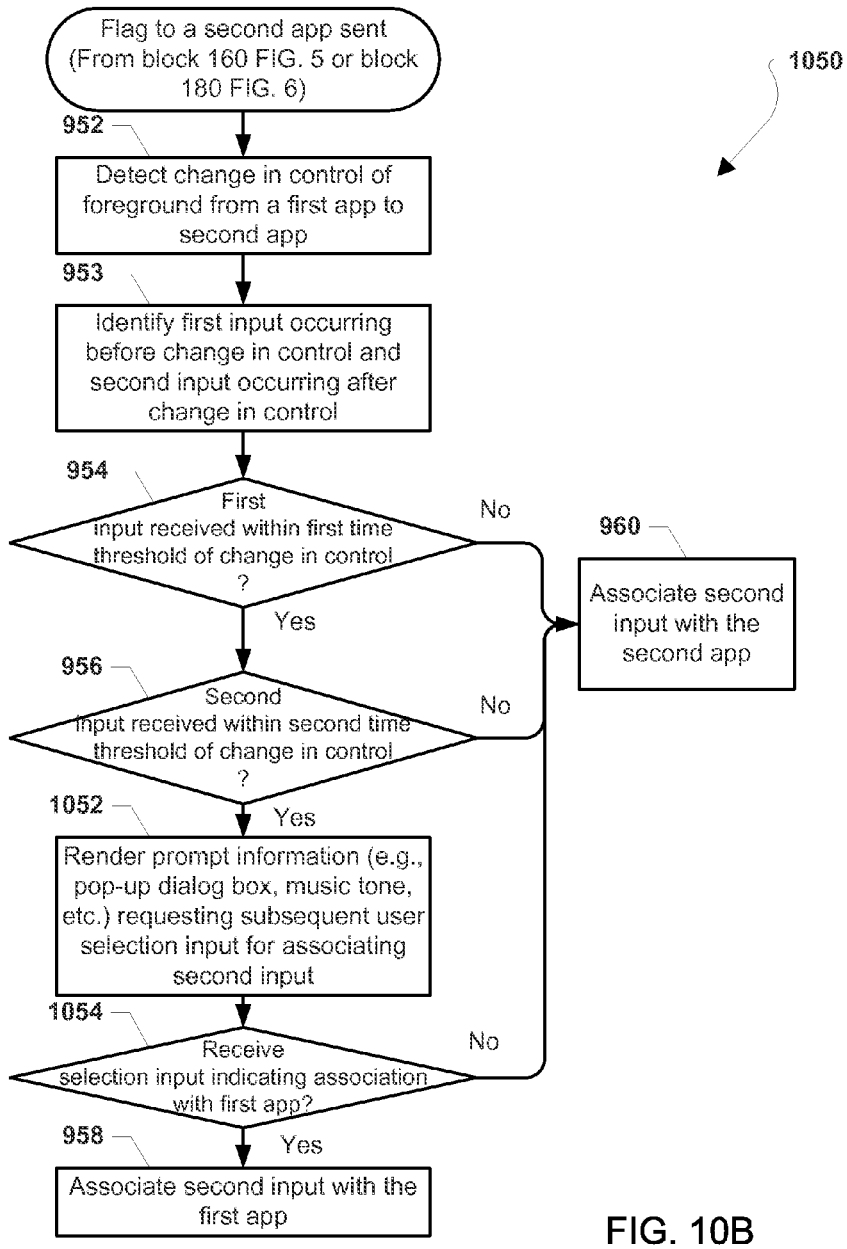
FIG. 10B is a process flow diagram of an embodiment method for a wireless communication device to associate received user input with a first or second application based on selection inputs corresponding to a prompt dialog box.

FIG. 10B illustrates an embodiment method 1050 for a wireless communication device to associate received user input with a first or second application based on timing information and selection inputs from a user. The method 1050 is similar to the method 950 described above, except that the method 1050 may include operations for disambiguating user inputs by using prompts to which a user may response. For example, the wireless communication device via the arbiter may perform operations to infer the intended target application for user inputs by evaluating various timing measurements, and may further render prompts (e.g., pop-up dialog boxes, tones, visuals, etc.) that invite or request selection inputs from users. In various embodiments, the method 1050 may be performed by the wireless communication device as part of the methods described above with reference to FIGS. 5-6. For example, the wireless communication device via the arbiter may perform the method 1050 after performing the operations in block 160 of FIG. 5 or block 180 of FIG. 6.

In block 952, the wireless communication device may detect a change in control of the foreground from a first application to a second application. In block 953, the wireless communication device may identify a first input occurring before the change in control and a second input occurring after the change in control. In determination block 954, the wireless communication device may determine whether the first input was received within a first time threshold of the change in control. If the first input was received outside of the first time threshold of the change in control (i.e., determination block 954="No"), in block 960 the wireless communication device may associate the second input with the second application. If the first input was received within of the first time threshold of the change in control (i.e., determination block 954="Yes"), in determination block 956, the wireless communication device may determine whether the second input occurred within a second time threshold of the change in control. If the second input was received outside of the second time threshold (i.e., determination block 956="No"), in block 960, the wireless communication device may associate the second input with the second application.

However, if the second input was received within the second time threshold (i.e., determination block 956="Yes"), in block 1052 the wireless communication device may render prompt information requesting subsequent user selection inputs for associating the second input. For example, the wireless communication device may render a pop-up dialog box, a sound (e.g., a musical sample, a tone, a chirp, an automated audible message, etc.), and/or a visual(s) (e.g., a displayed text message, a rendered symbol, etc.) that indicate further user inputs are needed to determine the intended application for the second input. The rendered prompt information may be considered a refinement to the purely time-based determination as described above with reference to FIG. 9B. In other words, the prompt information may only be generated when the wireless communication device determines that the second input was received within a second time window after the second application gained control of the foreground and the first input was received within a first time window before the change of control occurred. In this way, the prompt information may only be rendered in situations in which the intention of the user is especially ambiguous (i.e., the receipt of the second input is very close in time to either the change in control or the receipt of the first input). In an embodiment, when the wireless communication device is configured to render prompt information to disambiguate inputs, the first and second time thresholds may represent larger (or smaller) time windows based on a user preference.

In an embodiment, the wireless communication device may render audible prompt information that may indicate the change in control and that may be heard by a user even when he/she is not looking at the device. For example, when a user is entering input via speech-to-text or voice command mode into a first application (e.g., a notepad application) executing on the wireless communication device, the user may not be looking at the wireless communication device's display, and thus may not see when the second application (e.g., a timed calendar pop-up) gains control of the foreground. So, in order to notify the user, the wireless communication device may emit a special tone, chirp, music, sound, or message (e.g., "Switching to second application") that indicates the change of control (or change of focus). In an embodiment, when receiving voice inputs (e.g., speech-to-text input, voice data during a voice command mode, voice data for a phone call, etc.), the wireless communication device may periodically render background sounds that indicate the application currently in control of the foreground. For example, the wireless communication device may emit a first unique background noise or tone while the first application is in the foreground and may emit a second unique background noise or tone while the second application is in the foreground.

In determination block 1054, the wireless communication device may determine whether a selection input (or user selection input) indicating the second input is associated with the first app is received. For example, the wireless communication device may determine whether it detects a touch input or other button press corresponding to an arrow UI element on a pop-up dialog box that corresponds with associating the second input (e.g., the text "rld") with the first application. As another example, the wireless communication device may determine whether it detects a voice command (e.g., "switch back," "keep with the first application!," "revert to first," etc.) indicating the second input is associated with the first application. As yet another example, the wireless communication device may determine whether it detects a predefined visual gesture command (e.g., imagery captured by a camera that represents the user swiping his/hand to a certain side, imagery that represents the user making a certain hand signal, imagery that represents the user frowning/smiling, etc.) indicating the second input is associated with the first application. In various embodiments, the wireless communication device may be configured to process received selection inputs using software, methods, or routines for image processing, facial recognition, natural language processing, and/or other speech analysis. The wireless communication device may further be configured to compare received selection inputs (e.g., spoken words, on-screen gestures, etc.) to stored libraries or known patterns, words, images, and symbols in order to determine whether the selection input indicates the second input is associated with the second (or first) application.

In an embodiment, the wireless communication device may be configured to receive certain selection inputs, such as special voice commands or on-screen gestures, that disable changes in control. In other words, the wireless communication device may receive or record a voice command, spoken phrase, or physical gesture (e.g., hand signal, swipe, etc.) while the first application is in the foreground that informs the wireless communication device (and arbiter) ahead of time that in no circumstance should the current focus and associated inputs be interrupted. For example, during execution of a first application video call in the foreground, the wireless communication may record a voice command that indicates that the focus should not be changed until the video call has completed (e.g., "Stay on call until I'm done!").

If the selection input indicating the second input is associated with the first application is not received (i.e., determination block 1054="No"), in block 960 the wireless communication device may associate the second input with the second application. However, if the selection input indicating the second input is associated with the first application is received (i.e., determination block 1054="Yes"), in block 958, the wireless communication device may associate the second input with the first application.

Figure 11A:
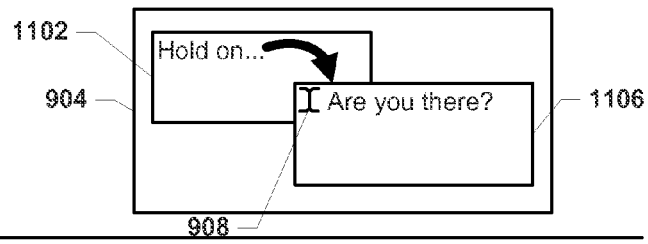
FIG. 11A is a representative illustration of a display of a user interface for a wireless communication device rendering a prompt dialog box in response processing received user input coinciding with a second application coming to the foreground.

FIG. 11A illustrates a display 904 of a wireless communication device rendering a first user interface 1102 for a first application, a second user interface 1106 for a second application coming to the foreground, and a cursor element 908 showing the focus as being on the second user interface 1106. Unlike the example illustrated above in FIG. 9A, the text input in the two interfaces 1102, 1106 is not separated in the middle of a word or phrase. Instead, based on the meaning or content of the text, a first input text "Hold on . . . " may indicate the user intends to temporarily stop interacting with the first user interface 1102 (e.g., a first video call application) and a second input text "Are you there?" may indicate the user intends to start interacting with the second user interface 1106 (e.g., a second video call application). However, if the time in between receiving the first input text and the second input text is shorter than a predefined threshold (e.g., the user quickly toggles or switches in between windows when frantically texting friends, etc.), the wireless communication device may not properly associate the second input text with the second user interface 1106. The embodiment method 1150 described below illustrates additional evaluations the wireless communication device may perform to properly associate received inputs when a change in foreground control occurs.

Figure 11B:
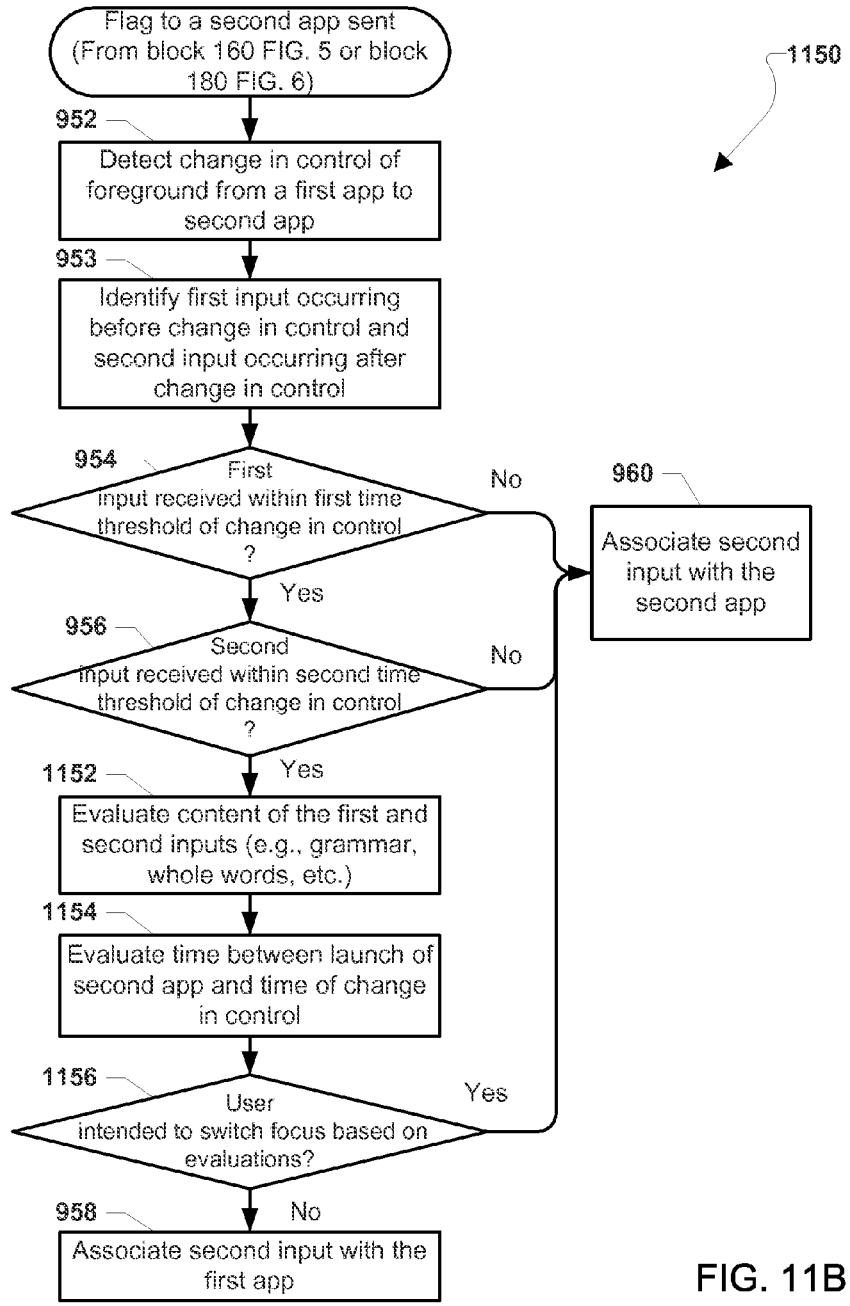
FIG. 11B is a process flow diagram of an embodiment method for a wireless communication device to associate received user input with a first or second application based on evaluations of the content of the received user input.

FIG. 11B illustrates an embodiment method 1150 for a wireless communication device to associate received user inputs with a first or second application based on evaluations of the content of the received user input. The method 1150 is similar to the methods 950 and 1050 described above, except that the method 1150 may include operations for disambiguating user inputs by evaluating the meaning and/or context of received user inputs in relation to a focus switch or change in control of the foreground. For example, when text user inputs cannot be clearly associated with a first or second application based only on their time of receipt (i.e., when they were typed into the wireless communication device), the wireless communication device may evaluate the meaning of the text user inputs to determine whether they include context clues for associating them to the various applications. As another example, the wireless communication device may compare the time of the launch of a second application to the time it actually pops-up (i.e., obtains control of the foreground or the focus) in order to determine whether the user intended inputs to be associated with the second application. In various embodiments, the method 1150 may be performed by the wireless communication device as part of the methods described above with reference to FIGS. 5-6. For example, the wireless communication device via the arbiter may perform the method 1150 after performing the operations in block 160 of FIG. 5 or block 180 of FIG. 6.

In block 952, the wireless communication device may detect a change in control of the foreground from a first application to a second application. In block 953, the wireless communication device may identify a first input occurring before the change in control and a second input occurring after the change in control. In determination block 954, the wireless communication device may determine whether the first input was received within a first time threshold of the change in control. If the first input was received outside of the first time threshold of the change in control (i.e., determination block 954="No"), in block 960 the wireless communication device may associate the second input with the second application. If the first input was received within of the first time threshold of the change in control (i.e., determination block 954="Yes"), in determination block 956, the wireless communication device may determine whether the second input occurred within a second time threshold of the change in control. If the second input was received outside of the second time threshold (i.e., determination block 956="No"), in block 960, the wireless communication device may associate the second input with the second application.

However, if the second input was received within the second time threshold (i.e., determination block 956="Yes"), in block 1152 the wireless communication device may evaluate the content of the first and second inputs. The content to be evaluated may include the grammar, spelling, punctuation, format, context, and interpreted meaning of the first and second inputs. The wireless communication device may perform natural language processing, speech recognition, and/or pattern matching routines to interpret the content of the inputs and determine whether the first and second inputs are connected. For example, the wireless communication device may evaluate the inputs to determine that the second input (e.g., "rld") is a continuation of the first input (e.g., "Hello Wo"). As another example, the wireless communication device may determine that the first input is a spoken input that indicates a final or conclusive statement or word (e.g., "hold on.") and the second input is a different spoken input that indicates a separate communication (e.g., "Hi, are you there?"). Based on the evaluations, the wireless communication device may interpret whether the first and second inputs make sense together or are otherwise appropriate for use with the first application.

In various embodiments, the content of the inputs (e.g., the grammar, wording, punctuation, format, spelling, formatting, and contextual or interpreted meaning of the inputs) may be evaluated by the wireless communication device to determine whether the first input and/or second input are related with the first and/or second application. The wireless communication may evaluate the inputs to identify partial words and phrases and/or whether the inputs include application-specific content or formatting (e.g., the second input may include the name of the second application or a contact name that is only associated with the second application, etc.). For example, the wireless communication device may detect when the second input names a business partner whose name is stored for use with the second application (e.g., a business email client) but not the first application (e.g., a script editor app). As another example, the wireless communication device may detect when the second input includes slang (e.g., "lol") or other informal abbreviations (e.g., no capital letters at the beginning of sentences, etc.) that may only be used by the user in an SMS messaging application but not in a business email client.

In an embodiment, the wireless communication device may further interpret the content of the second input in relation to the format or expected type of data to be used within the second application. For example, the wireless communication may evaluate whether the spoken word second input (e.g., "hello") is appropriate or correct for an input element for the second application (e.g., does "hello" make sense entered into a web form text field related to a billing address?). As another example, if the second input is the name of a city (e.g., San Diego), the wireless communication device may determine that the second input is appropriate for the text box having focus in the second application.

In block 1154, the wireless communication device may evaluate the time between the launch of the second application and the time of the change in control (or switch in focus), such as by finding the elapsed time between the launch time of the second application and the change in the control. The wireless communication device may interpret the order of the launch of the second application, the receipt of the first and/or second inputs, and the change in control. For example, the wireless communication device may evaluate the time of launching a browser app, when typed text was received, and when the browser app actually popped-up to interpret whether the typed text was intended for the browser. In an embodiment, the wireless communication device may determine that the second input is less likely to be associated with the second application the greater the time in between when the second application was launched and when the second application takes control of the foreground. In other words, when the second application takes a long time to load from a launch time (e.g., the time the user clicked on an executable, etc.), the wireless communication device may receive inputs associated with the first application as the user is multi-tasking while waiting for the second application. For example, a user who is quickly typing into the first application (e.g., a notepad) may launch the second application (e.g., a browser app) while typing and continue typing with the first application while waiting for the second application to fully load and control the foreground. As another example, if the second application was launched several minutes ago (e.g., ten minutes, etc.), the wireless communication device may evaluate the second input text as likely being associated with the first application. However, if the second application was launched only a few seconds ago, then the wireless communication device may evaluate the second input text as likely being associated with the second application.

In various embodiments, the wireless communication device may evaluate the recentness and/or order of the user's actions to launch the second application. In particular, the wireless communication device may evaluate received user inputs on a soft keyboard or buttons, whether the user actively initiated the launch of the second application (e.g., was it auto-scheduled or the result of a user input), user actions or inputs in between the launch of the second application and the change in control, the time between receiving a user input (e.g., button press) corresponding with a new screen on the second application and the launch time of the second application, and the time between the last entry in a previous screen of the first application and a subsequent button press. As a non-limiting illustration, based on a detected user input to launch the second application, historical information indicating the second application typically takes a significant time to obtain control of the foreground after being launched, another detected user input to launch the first application (e.g., a phone app), receiving typed text inputs (e.g., a phone number), and an eventual change of control to the second application, the wireless communication device may determine that button presses are all tight together and conclude that the user likely intends to start a call with the first application.

In an embodiment, the wireless communication device may also evaluate stored, historical information (e.g., heuristics), such as data describing the average launch or load times for various applications resident on the wireless communication device computer platform. Based on evaluating prior experiences, the wireless communication device may determine the likelihood that a user may know approximately when the second application will pop-up, and therefore would have timed his input accordingly. For example, the wireless communication device may compare the current time from launch to controlling the foreground for a web browser application to the historical average load times for the web browser application to determine whether the user may have expected the second input text data to be associated with the web browser application.

In determination block 1156, the wireless communication device may determine whether the user intended to switch the focus of the foreground based on the evaluations (i.e., the evaluated content and/or the evaluated launch time), such as by using conclusions from the evaluations described above with reference to the operations in blocks 1152-1154. In other words, the wireless communication device may use interpretations of the inputs and/or the launch time of the second application to infer whether the user meant to provide the second input to the second application. The wireless communication device may utilize various rule sets, balancing systems, weighting schemes, and decision-making equations for making the determination. For example, based on the evaluation of the language analysis of the first and second inputs that indicates the first input (e.g., typed text of "hold on . . . ") is unrelated to the second input (e.g., typed text of "are you there?"), the wireless communication device may determine the user did intend to switch focus. As another example, when the wireless communication device is unable to clearly determine the intended meaning of the language of the first and second inputs (e.g., the received inputs are seemingly random characters, misspelled, using unknown shorthand, etc.), the wireless communication device may place more emphasis on the evaluation of the time in between launching the second application and the time it gained control of the foreground.

If it is not determined that the user intended to switch input windows based on the evaluations (i.e., determination block 1156="No"), in block 960 the wireless communication device may associate the second input with the second application. However, if it is determined that the user intended to switch input windows based on the evaluations (i.e., determination block 1156="Yes"), in block 958, the wireless communication device may associate the second input with the first application.

In various embodiments, the wireless communication device may evaluate the content of the first and second inputs in combination with or in place of the various evaluations of timing information (i.e., the operations in determination blocks 954-956 and block 1154) in order to determine the application to which the second input should be associated. For example, the wireless communication device may evaluate only the grammar and/or word meaning of the first and second typed inputs to determine whether the second input is associated with the first application, regardless of the time in between receiving the first and second inputs. As another example, the wireless communication device may use the evaluation of time between launch and change in control as one of a plurality of factors in identifying the application associated with the second input. As another example, even when the first input is determined to not be within the first time threshold and/or the second input is determined to not be within the second time threshold, the wireless communication may be configured to evaluate the content of the first and second inputs to determine whether the user intended the second input to be applied to the second application.

Figure 12:
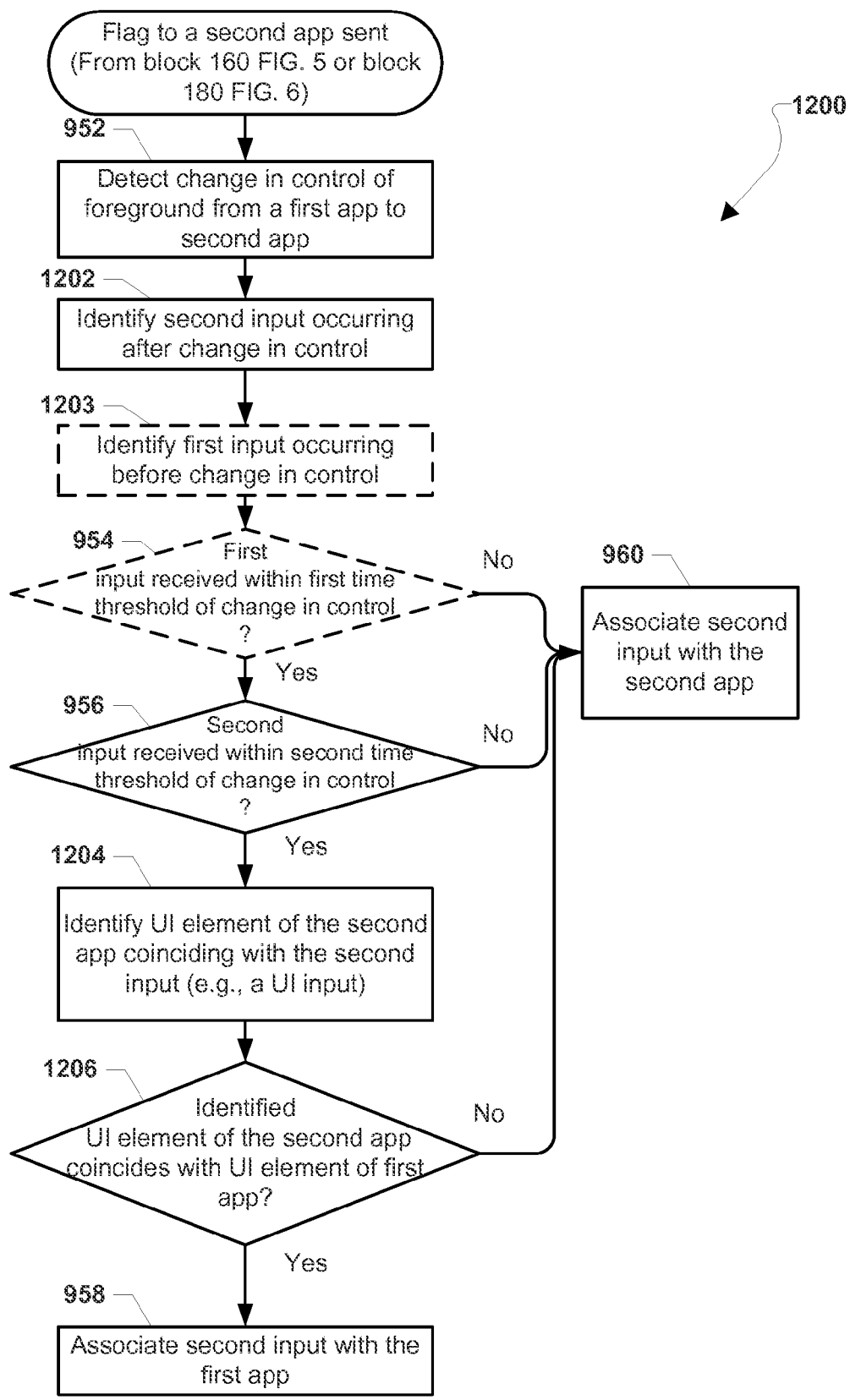
FIG. 12 is a process flow diagram of an embodiment method for a wireless communication device to associate received user input with a first or second application based on the locations of user interface elements of the first and second applications.

FIG. 12 illustrates an embodiment method 1200 for a wireless communication device to associate received user input with a first or second application based on the locations of user interface elements of the first and second applications. Applications may use standard layouts for user interface elements (e.g., soft buttons, etc.). For example, a first application may have a 'search' button in the top right portion of a first user interface window and a second application may have a 'delete' button in the top right portion of a second user interface window. When focus is switched unexpectedly while a user is interacting with such user interface elements, unintended actions may be executed. For example, right before the user presses the 'search' button on the first application, the second application may pop-up a window to control the foreground and the user may accidentally press the 'delete' button that is located in the same place on the wireless communication device's touchscreen as the 'search' button. The method 1200 may include operations for the wireless communication device to determine the user's intent when user elements of the first and second applications are coincidentally collocated in order to avoid unintended UI actions in the second application. In various embodiments, the method 1200 may be performed by the wireless communication device as part of the methods described above with reference to FIGS. 5-6. For example, the wireless communication device via the arbiter may perform the method 1200 after performing the operations in block 160 of FIG. 5 or block 180 of FIG. 6.

In block 952, the wireless communication device may detect a change in control of the foreground window from a first application to a second application. In block 1202, the wireless communication device may identify a second input occurring after the change in the control, such as a touch input on a user interface. In optional block 1203, the wireless communication device may identify a first input occurring before the change in the control. The operations in blocks 1202-1203 may be similar to as described above with reference to block 953, however the operations for identifying the first input may be optional, as the user may only provide a single input (i.e., the second input) that needs to be associated by the wireless communication device.

In optional determination block 954, the wireless communication device may determine whether the first input was received within a first time threshold of the change in control. If the first input was received outside of the first time threshold of the change in control (i.e., optional determination block 954="No"), in block 960 the wireless communication device may associate the second input with the second application. If the first input was received within of the first time threshold of the change in control (i.e., optional determination block 954="Yes"), the wireless communication device may determine whether the second input occurred within a second time threshold of the change in control in determination block 956. For example, the wireless communication device may determine whether a user interface element press was detected within a certain number of milliseconds, seconds, etc. from the change of control to the second application. As another example, the wireless communication device may compare the time (or timestamp) of a detected UI button event with the time that the second application obtained control of the foreground. If the second input was received outside of the second time threshold (i.e., determination block 956="No"), the wireless communication device may associate the second input with the second application in block 960. For example, because a UI element press event was detected a few seconds after the second application gained control of the foreground, the wireless communication device may determine the press was intended for the second application.

However, if the second input was received within the second time threshold (i.e., determination block 956="Yes"), in block 1204, the wireless communication device may identify a user interface (UI) element of the second application coinciding with the second input (e.g., a detected UI touch input). For example, the wireless communication device may compare the screen coordinates associated with the second input (e.g., a detected UI input having certain x-axis and y-axis coordinates) to the areas of the display that correspond to the various UI elements rendered for the second application. In other words, the wireless communication device may identify the soft button, text field, or other rendered element that the user clicked, pressed, or otherwise engaged with the second input. In an embodiment, the wireless communication device may evaluate raster information or other graphics data to identify the UI element.

In determination block 1206, the wireless communication device may determine whether the identified UI element of the second application coincides with a UI element of the first application. For example, the wireless communication device may compare the screen coordinates of the identified UI element to all UI elements that were previously in the foreground with the first application. The wireless communication device may utilize a threshold to determine any similarly-placed UI elements of the first application (i.e., the identified second application UI element may not need to be placed exactly on top of a first application UI element to match). If the identified UI element does not coincide with a UI element of the first application (i.e., determination block 1206="No"), the wireless communication device may associate the second input with the second application in block 960. In other words, as the second input (e.g., a UI touch input) was received within a certain time of the second application gaining control of the foreground but there were no similarly-placed UI elements for the first application, the wireless communication device may infer the user likely intended to interact with the second application.

However, if the identified UI element does coincide with a UI element of the first application (i.e., determination block 1206="Yes"), in block 958 the wireless communication device may associate the second input with the first application. In other words, as the second input (e.g., a UI touch input) was received within a certain time of the second application gaining control of the foreground and the first and second applications had similarly-placed UI elements, the wireless communication device may infer that the user likely intended to interact with the first application. In various embodiments, the wireless communication device may utilize various other factors, such as time from launch of the second application, to determine whether the second input was intended for the second or first application.

As described above, in various embodiments, multiple applications may be simultaneously executing on the processor of the wireless communication device as background processes (or suspended applications) while a primary application controls the foreground (or display). For example, a second application may be suspended (or configured to run in suspended mode) in the background of the wireless communication device as a first application controls the foreground. Although the suspended applications may not be active (e.g., not controlling the foreground), any suspended application may become active and come to foreground, such as in response to receiving a flag from the arbiter as described above. For example, in response to receiving from the operating system a notification event corresponding to a received SMS message, the arbiter (or arbiter app) may notify a first application to control the foreground (i.e., the first application is instructed to stay active in the foreground) and prohibit a second application from coming to the foreground (i.e., the second application is instructed to stay inactive the background).

However, inactive applications may still attempt to come to the foreground, regardless of the actions of the arbiter. For example, a second application that did not receive a flag from the arbiter permitting the second application to come to the foreground may still perform operations to gain control of the foreground. Such non-compliant (or "rogue") applications may attempt to override priority determinations of the arbiter based on data or preferences available to the applications but not the arbiter. For example, a non-compliant application may store local, hidden, or unregistered configurations information that indicates the application typically obtains control of the foreground at a random time of day. In such a case, the wireless communication device may terminate the non-compliant applications. In various embodiments, such terminations may be performed by the wireless communication device via an arbiter that may be part of the operating system of the wireless communication device or otherwise have administrative privileges that may enable the arbiter to directly control other applications.

Figure 13:
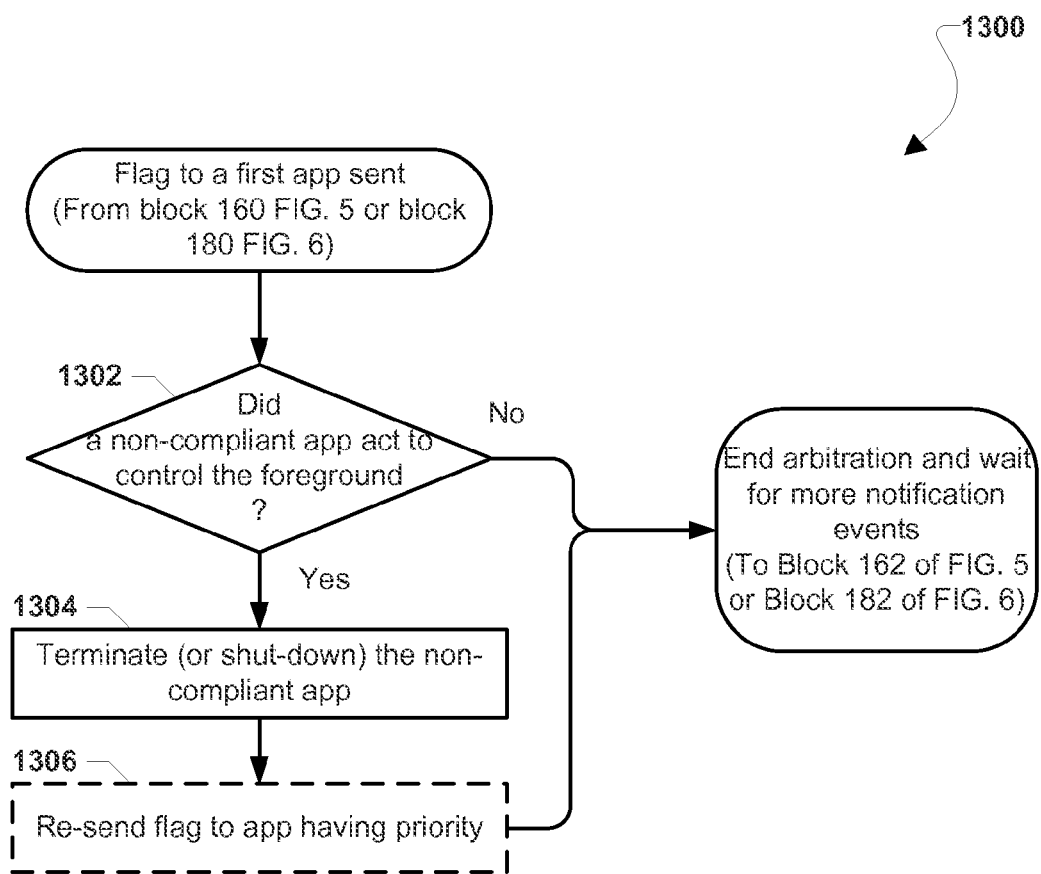
FIG. 13 is a process flow diagram of an embodiment method for a wireless communication device to terminate a non-compliant application that has gained control of the foreground of the wireless communication device in contradiction of priority determinations by an arbiter.

FIG. 13 illustrates an embodiment method 1300 for a wireless communication device to terminate a non-compliant application that has gained control of the foreground of the wireless communication device in contradiction of priority determinations by an arbiter. In other words, after performing arbitration operations in response to receiving a notification event, the wireless communication device may shut-down, suspend, or otherwise terminate any application that subsequently performs operations that do not conform to the arbitration. For example, when a second application comes to the foreground after the wireless communication device (via the arbiter) authorized a first application to control the foreground and process received user input (e.g., "Hello Wo"), the wireless communication device may terminate the second application and apply any subsequently received user input (e.g., "rld") to the first application. In various embodiments, the method 1300 may be performed by the wireless communication device as part of the methods described above with reference to FIGS. 5-6. For example, the wireless communication device via the arbiter may perform the method 1300 after performing the operations in block 160 of FIG. 5 or block 180 of FIG. 6.

In determination block 1302, the wireless communication device may determine whether a non-compliant application acted to control the foreground, such as by coming to the foreground without having received a priority flag from an arbiter. In an embodiment, the wireless communication device may make this determination by periodically comparing the identity of the application currently controlling the foreground to the identity of the priority application determined via arbitration operations, as described above. In another embodiment, the wireless communication device may make this determination by comparing the identity of the application currently controlling the foreground to the identity of the priority application determined via arbitration in response to detecting a change in control or other status change or receiving an unexpected event notification (e.g., a signal indicating a switch in focus, etc.). If it is not determined the non-compliant application acted to control foreground (i.e., determination block 1302="No"), the wireless communication device may continue with operations to monitor for and process other event notifications.

However, if it is determined the non-compliant application acted to control the foreground (i.e., determination block 1302="Yes"), in block 1304, the wireless communication device may terminate (or shut-down) the non-compliant application, such as by sending a terminate signal or suspend message to the non-compliant application. In an embodiment, the wireless communication device via the arbiter may not only terminate the non-compliant application, shutting it down, but may also prohibit the non-compliant application from running again. For example, during a period (e.g., millisecond, second, etc.) after the termination of the non-compliant application, the wireless communication device via the arbiter may monitor for subsequent attempts by the non-compliant application to launch and/or control the foreground and may repeat the operations in block 1304. In optional block 1306, the wireless communication device may re-send the flag to the application having priority, such as the priority application determined via the operations described above with reference to FIG. 5 or FIG. 6.

A non-compliant application may be configured to override suspend messages sent by the wireless communication device, such as via the arbiter. For example, based on information not available to an arbiter app, the non-compliant application may ignore a received suspend message or terminal signal in order to maintain control of the foreground. This case may occur when the wireless communication device does not have upgraded software (e.g., out-of-date arbiter routines, app, or software).

FIG. 14 is a system block diagram of a smartphone wireless communication device 1400 suitable for use with various embodiments. The smartphone wireless communication device 1400 may include a processor 1401 coupled to internal memory 1402 and to a speaker 1454. The internal memory 1402 may be volatile or non-volatile memory, and may also be secure and/or encrypted memory, or unsecure and/or unencrypted memory, or any combination thereof. The processor 1401 may also be coupled to a first display 1403, such as a resistive-sensing touch screen, capacitive-sensing touch screen infrared sensing touch screen, etc. In an embodiment, the first display 1403 of the smartphone wireless communication device 1400 need not have touch screen capability. In an embodiment, the smartphone wireless communication device 1400 may also include a second display 1460 coupled to the processor 1401, such as another touch screen or an LED screen. In various embodiments, the second display 1460 may be configured to be hidden or closed for inactivity, such as when the smartphone wireless communication device utilize a hinge mechanism and is configured to close like a "clam shell." Alternatively, the second display 1460 may be a display unit affixed to or embedded within the case or housing of the smartphone wireless communication device 1400. For example, the second display 1460 may be a second screen on the back of the housing of the wireless communication device 1400. In other embodiments, the second display 1460 may be tethered to the smartphone wireless communication device 1400 via wired or wireless connections (not shown).

The smartphone wireless communication device 1400 may have one or more radio signal transceivers 1405 (e.g., Peanut, Bluetooth, Zigbee, WiFi, RF radio, etc.) and antennas 1404 for sending and receiving electromagnetic radiation (or wireless signals), such as for communicating over a WiFi local area network or a wide area network. The transceivers 1118 and antennas 1108 may be coupled to the processor 1401 and may be used with the above-mentioned circuitry to implement the various wireless transmission protocol stacks/interfaces. In an embodiment, the smartphone wireless communication device 1400 may include a cellular network wireless modem chip 1415 that enables communication via a cellular network. The smartphone wireless communication device 1400 typically may also include menu selection buttons or rocker switches 1408 for receiving user inputs. Additionally, the smartphone wireless communication device 1400 may include various sensors coupled to the processor 1401, such as a thermistor 1462, an accelerometer 1410, a gyroscope 1411, a microphone 1412, and a camera 1413. Additionally, smartphone wireless communication device 1400 may include a GPS receiver chip 1414 coupled to the processor 1401.

The processors 84 and 1401 may be any programmable microprocessor, microcomputer or multiple processor chip or chips that may be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory 88 and 1402 before they are accessed and loaded into the processors 84 and 1401. The processors 84 and 1401 may include internal memory sufficient to store the application software instructions. In many devices the internal memory may be a volatile or nonvolatile memory, such as flash memory, or a mixture of both. For the purposes of this description, a general reference to memory refers to memory accessible by the processors 84 and 1401 including internal memory or removable memory plugged into the various devices and memory within the processors 84 and 1401.

The foregoing method descriptions and the process flow diagrams are provided merely as illustrative examples and are not intended to require or imply that the steps of the various embodiments must be performed in the order presented. As may be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, processor-executable instructions, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In view of the methods being executable on a mobile communication device and other computer platforms, the methods may accordingly be performed by a program resident in a non-transitory computer readable medium (or non-transitory processor-readable storage medium), where the program directs the mobile device or other computer device having a computer platform to perform the steps of the methods. The non-transitory computer readable medium may be the memory of the server, or may be in a connective database. Further, non-transitory the computer readable medium may be in a secondary storage media that is loadable onto a wireless communication device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored as one or more instructions (e.g., processor-executable instructions or processor-executable software instructions) or code on a non-transitory computer-readable medium (or non-transitory processor-readable storage medium). Non-transitory computer-readable media includes computer storage media including any medium that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

While the invention has been particularly shown and described with reference to a preferred embodiment thereof, it may be understood by those skilled in the art that various changes in form and detail may be made without departing from the scope of the present invention as set forth in the following claims. Thus, the present invention is not intended to be limited to the embodiments shown herein but is to be accorded the widest scope consistent with the following claims and the principles and novel features disclosed herein. Furthermore, although elements of the invention may be described or claimed in the singular, the plural is contemplated unless limitation to the singular is explicitly stated.

What is claimed is:

1. A method of assigning control of each of a plurality of displays to an application of a plurality of applications resident on a wireless communication device, comprising:
   determining via an arbiter a first application of the plurality of applications that controls one of the plurality of displays based upon predetermined criteria in response to receiving a first notification event that simultaneously invokes more than one application;
   determining whether an activity relevant to a second application of the plurality of applications is detected in response to determining via the arbiter that the first application controls the one of the plurality of displays;
   ordering a list of viable displays of the plurality of displays in order of priority for the second application in response to detecting the activity relevant to the second application;
   selecting a display in the ordered list of viable displays of the plurality of displays;
   determining whether the selected display is in use by a third application; and
   sending to the second application a flag that assigns control of a foreground of the selected display in response to determining the selected display is not in use by the third application.

2. The method of claim 1, further comprising sending to the second application the flag that assigns the control of the foreground of the selected display in response to determining that the selected display is in use by the third application and a priority of the third application is lower than a priority of the second application.

3. The method of claim 1, wherein the activity is at least one of a second notification event, a predefined event indicated within registration information associated with the second application, an encountered exception, a priority change of one of the plurality of applications, a registration of a new application with the arbiter, a change in an operating status of one of the plurality of applications, a loss of control of a display foreground by one of the plurality of applications, and a change in activity state of one of the plurality of displays.

4. The method of claim 1, further comprising adding the second application to a wait queue for the selected display in response to determining that the selected display is in use by the third application of the plurality of applications and the priority of the third application is higher than the priority of the second application.

5. The method of claim 1, further comprising registering each of the plurality of applications with the arbiter in response to one of a boot-up of a computer platform of the wireless communication device, an activation of each of the plurality of applications, and a received request for registration, wherein registering each of the plurality of applications with the arbiter comprises storing registration information for each of the plurality of applications.

6. The method of claim 5, where the registration information for an individual application of the plurality of applications includes at least one of an identification, a priority, network requirements, an indication of whether the individual application may be dynamically reprioritized, and an indication of whether the individual application can be used on a secondary display of the plurality of displays, and an indication of whether the individual application is background-enabled.

7. The method of claim 6, further comprising re-calculating priorities for each of the plurality of applications that is registered for dynamic reprioritization.

8. The method of claim 1, further comprising:
storing status information for each of the plurality of displays, wherein the status information includes at least an operating condition, operating requirements, and a display priority;
polling sensors for information indicating current conditions of the wireless communication device;
evaluating a viability of each of the plurality of displays based on the stored status information and the information indicating the current conditions of the wireless communication device;
evaluating a user interaction with each of the plurality of displays based on the information indicating the current conditions of the wireless communication device; and
re-calculating the priority of each of the plurality of displays based on at least one of the evaluated viability of each of the plurality of displays and the evaluated user interaction.

9. The method of claim 8, wherein the current conditions of the wireless communication device include at least one of an ambient temperature based on thermistor sensor data, an ambient brightness based on camera data, a device altitude based on GPS data, a device movement based on gyroscope sensor data, a device inclination based on the gyroscope sensor data, user inputs on a touchscreen, and an identity of a user based on the camera data or microphone data.

10. The method of claim 8, wherein the user interaction indicates at least one of a user is looking at a display based on eye tracking, the user is looking at a display based on head tracking, and the user is touching a display.

11. The method of claim 8, wherein re-calculating the priority of each of the plurality of displays based on at least one of the evaluated viability of each of the plurality of displays and the evaluated user interaction comprises re-calculating for each of the plurality of applications the priority of each of the plurality of displays based on at least one of the evaluated viability of each of the plurality of displays and the evaluated user interaction.

12. A method of associating user input data with a plurality of applications resident on a wireless communication device in accordance with a user intent, comprising:
determining via an arbiter a first application of the plurality of applications that controls a display of the wireless communication device based upon predetermined criteria in response to receiving a notification event that simultaneously invokes more than one application;
detecting, in response to determining via the arbiter that the first application controls the display, a change in a control of the display from the first application in the plurality of applications to a second application in the plurality of applications;
identifying a first input received before the detected change in the control of the display and a second input received after the detected change in the control of the display;
determining whether the first input was received within a first time threshold of the detected change in the control of the display;
determining whether the second input was received within a second time threshold of the detected change in the control of the display; and
associating the second input with the second application in response to determining that the first input was not received within the first time threshold or the second input was not received within the second time threshold.

13. The method of claim 12, wherein the first input and the second input are both one of touch inputs, text inputs, spoken inputs, or visual inputs.

14. The method of claim 12, further comprising associating the second input with the first application in response to determining that the first input was received within the first time threshold and that the second input was received within the second time threshold.

15. The method of claim 12, further comprising:
rendering a prompt requesting a user selection input for associating the second input with one of the first application and the second application in response to determining that the first input was received within the first time threshold and the second input was received within the second time threshold;
receiving the user selection input via a user interface; and
associating the second input with one of the first application and the second application based on the received user selection input.

16. The method of claim 15, wherein:
the first input is a verbal input;
the prompt is a second sound; and
the method further comprises rendering a first sound prior to detecting the change in the control of the display.

17. The method of claim 12, further comprising:
evaluating a content of the first input and the second input in response to determining that the first input was received within the first time threshold and the second input was received within the second time threshold;
evaluating a launch time of the second application in relation to the detected change in the control in response to determining that the first input was received within the first time threshold and the second input was received within the second time threshold; and
associating the second input with the first application or the second application based on at least one of the evaluated content and the evaluated launch time.

18. The method of claim 17, wherein the content is at least one of a grammar, a spelling, a punctuation, a format, a context, and an interpreted meaning.

19. The method of claim 12, wherein the second input is a touch input, the method further comprising:
- identifying a second user interface element of the second application corresponding to the second input in response to determining that the first input was received within the first time threshold and the second input was received within the second time threshold;
- determining whether the identified second user interface element of the second application coincides with a first user interface element of the first application; and
- associating the second input with the first application in response to determining that the identified second user interface element coincides with the first user interface element.

20. A method of controlling a plurality of applications resident on a wireless communication device, comprising:
- determining via an arbiter a first application of the plurality of applications controls a display of the wireless communication device based upon predetermined criteria in response to receiving a notification event that simultaneously invokes more than one application;
- determining whether a second application of the plurality of applications did not comply with the determination via the arbiter that the first application of the plurality of applications controls the display; and
- terminating the second application in response to determining that the second application of the plurality of applications did not comply.

21. A wireless communication device, comprising:
- means for determining via an arbiter a first application of a plurality of applications that controls one of a plurality of displays based upon predetermined criteria in response to receiving a first notification event that simultaneously invokes more than one application;
- means for determining whether an activity relevant to a second application of the plurality of applications is detected in response to determining via the arbiter that the first application controls the one of the plurality of displays;
- means for ordering a list of viable displays of the plurality of displays in order of priority for the second application in response to detecting the activity relevant to the second application;
- means for selecting a display in the ordered list of viable displays of the plurality of displays;
- means for determining whether the selected display is in use by a third application; and
- means for sending to the second application a flag that assigns control of a foreground of the selected display in response to determining the selected display is not in use by the third application.

22. The wireless communication device of claim 21, further comprising means for sending to the second application the flag that assigns the control of the foreground of the selected display in response to determining that the selected display is in use by the third application and a priority of the third application is lower than a priority of the second application.

23. The wireless communication device of claim 21, wherein the activity is at least one of a second notification event, a predefined event indicated within registration information associated with the second application, an encountered exception, a priority change of one of the plurality of applications, a registration of a new application with the arbiter, a change in an operating status of one of the plurality of applications, a loss of control of a display foreground by one of the plurality of applications, and a change in activity state of one of the plurality of displays.

24. The wireless communication device of claim 21, further comprising means for adding the second application to a wait queue for the selected display in response to determining that the selected display is in use by the third application of the plurality of applications and the priority of the third application is higher than the priority of the second application.

25. The wireless communication device of claim 21, further comprising means for registering each of the plurality of applications with the arbiter in response to one of a boot-up of a computer platform of the wireless communication device, an activation of each of the plurality of applications, and a received request for registration,
- wherein means for registering each of the plurality of applications with the arbiter comprises storing registration information for each of the plurality of applications.

26. The wireless communication device of claim 25, where the registration information for an individual application of the plurality of applications includes at least one of an identification, a priority, network requirements, an indication of whether the individual application may be dynamically reprioritized, and an indication of whether the individual application can be used on a secondary display of the plurality of displays, and an indication of whether the individual application is background-enabled.

27. The wireless communication device of claim 26, further comprising means for re-calculating priorities for each of the plurality of applications that is registered for dynamic reprioritization.

28. The wireless communication device of claim 21, further comprising:
- means for storing status information for each of the plurality of displays, wherein the status information includes at least an operating condition, operating requirements, and a display priority;
- means for polling sensors for information indicating current conditions of the wireless communication device;
- means for evaluating a viability of each of the plurality of displays based on the stored status information and the information indicating the current conditions of the wireless communication device;
- means for evaluating a user interaction with each of the plurality of displays based on the information indicating the current conditions of the wireless communication device; and
- means for re-calculating the priority of each of the plurality of displays based on at least one of the evaluated viability of each of the plurality of displays and the evaluated user interaction.

29. The wireless communication device of claim 28, wherein the current conditions of the wireless communication device include at least one of an ambient temperature based on thermistor sensor data, an ambient brightness based on camera data, a device altitude based on GPS data, a device movement based on gyroscope sensor data, a device inclination based on the gyroscope sensor data, user inputs on a touchscreen, and an identity of a user based on the camera data or microphone data.

30. The wireless communication device of claim 28, wherein the user interaction indicates at least one of a user is looking at a display based on eye tracking, the user is looking at a display based on head tracking, and the user is touching a display.

31. The wireless communication device of claim 28, wherein means for re-calculating the priority of each of the plurality of displays based on at least one of the evaluated viability of each of the plurality of displays and the evaluated user interaction comprises means for re-calculating for each of the plurality of applications the priority of each of the plurality of displays based on at least one of the evaluated viability of each of the plurality of displays and the evaluated user interaction.

32. A wireless communication device, comprising:
 means for determining via an arbiter a first application of a plurality of applications that controls a display of the wireless communication device based upon predetermined criteria in response to receiving a notification event that simultaneously invokes more than one application;
 means for detecting, in response to determining via the arbiter that the first application controls the display, a change in a control of the display from the first application in the plurality of applications to a second application in the plurality of applications;
 means for identifying a first input received before the detected change in the control of the display and a second input received after the detected change in the control of the display;
 means for determining whether the first input was received within a first time threshold of the detected change in the control of the display;
 means for determining whether the second input was received within a second time threshold of the detected change in the control of the display; and
 means for associating the second input with the second application in response to determining that the first input was not received within the first time threshold or the second input was not received within the second time threshold.

33. The wireless communication device of claim 32, wherein the first input and the second input are both one of touch inputs, text inputs, spoken inputs, or visual inputs.

34. The wireless communication device of claim 32, further comprising means for associating the second input with the first application in response to determining that the first input was received within the first time threshold and that the second input was received within the second time threshold.

35. The wireless communication device of claim 32, further comprising:
 means for rendering a prompt requesting a user selection input for associating the second input with one of the first application and the second application in response to determining that the first input was received within the first time threshold and the second input was received within the second time threshold;
 means for receiving the user selection input via a user interface; and
 means for associating the second input with one of the first application and the second application based on the received user selection input.

36. The wireless communication device of claim 35, wherein:
 the first input is a verbal input;
 the prompt is a second sound; and
 the wireless communication device further comprises means for rendering a first sound prior to detecting the change in the control of the display.

37. The wireless communication device of claim 32, further comprising:
 means for evaluating a content of the first input and the second input in response to determining that the first input was received within the first time threshold and the second input was received within the second time threshold;
 means for evaluating a launch time of the second application in relation to the detected change in the control in response to determining that the first input was received within the first time threshold and the second input was received within the second time threshold; and
 means for associating the second input with the first application or the second application based on at least one of the evaluated content and the evaluated launch time.

38. The wireless communication device of claim 37, wherein the content is at least one of a grammar, a spelling, a punctuation, a format, a context, and an interpreted meaning.

39. The wireless communication device of claim 32, wherein the second input is a touch input, the wireless communication device further comprising:
 means for identifying a second user interface element of the second application corresponding to the second input in response to determining that the first input was received within the first time threshold and the second input was received within the second time threshold;
 means for determining whether the identified second user interface element of the second application coincides with a first user interface element of the first application; and
 means for associating the second input with the first application in response to determining that the identified second user interface element coincides with the first user interface element.

40. A wireless communication device, comprising:
 means for determining via an arbiter a first application of a plurality of applications controls a display of the wireless communication device based upon predetermined criteria in response to receiving a notification event that simultaneously invokes more than one application;
 means for determining whether a second application of the plurality of applications did not comply with the determination via the arbiter that the first application of the plurality of applications controls the display; and
 means for terminating the second application in response to determining that the second application of the plurality of applications did not comply.

41. A wireless communication device, comprising:
 a memory; and
 a processor coupled to the memory, wherein the processor is configured with processor-executable instructions to perform operations comprising:
  determining via an arbiter a first application of a plurality of applications that controls one of a plurality of displays based upon predetermined criteria in response to receiving a first notification event that simultaneously invokes more than one application;
  determining whether an activity relevant to a second application of the plurality of applications is detected in response to determining via the arbiter that the first application controls the one of the plurality of displays;
  ordering a list of viable displays of the plurality of displays in order of priority for the second application in response to detecting the activity relevant to the second application;
  selecting a display in the ordered list of viable displays of the plurality of displays;

determining whether the selected display is in use by a third application; and sending to the second application a flag that assigns control of a foreground of the selected display in response to determining the selected display is not in use by the third application.

42. The wireless communication device of claim 41, wherein the processor is configured with processor-executable instructions further comprising sending to the second application the flag that assigns the control of the foreground of the selected display in response to determining that the selected display is in use by the third application and a priority of the third application is lower than a priority of the second application.

43. The wireless communication device of claim 41, wherein the activity is at least one of a second notification event, a predefined event indicated within registration information associated with the second application, an encountered exception, a priority change of one of the plurality of applications, a registration of a new application with the arbiter, a change in an operating status of one of the plurality of applications, a loss of control of a display foreground by one of the plurality of applications, and a change in activity state of one of the plurality of displays.

44. The wireless communication device of claim 41, wherein the processor is configured with processor-executable instructions further comprising adding the second application to a wait queue for the selected display in response to determining that the selected display is in use by the third application of the plurality of applications and the priority of the third application is higher than the priority of the second application.

45. The wireless communication device of claim 41, wherein the processor is configured with processor-executable instructions further comprising registering each of the plurality of applications with the arbiter in response to one of a boot-up of a computer platform of the wireless communication device, an activation of each of the plurality of applications, and a received request for registration, and wherein the processor is configured with processor-executable instructions such that registering each of the plurality of applications with the arbiter comprises storing registration information for each of the plurality of applications.

46. The wireless communication device of claim 45, where the registration information for an individual application of the plurality of applications includes at least one of an identification, a priority, network requirements, an indication of whether the individual application may be dynamically reprioritized, and an indication of whether the individual application can be used on a secondary display of the plurality of displays, and an indication of whether the individual application is background-enabled.

47. The wireless communication device of claim 46, wherein the processor is configured with processor-executable instructions further comprising re-calculating priorities for each of the plurality of applications that is registered for dynamic reprioritization.

48. The wireless communication device of claim 41, wherein the processor is configured with processor-executable instructions further comprising:

storing status information for each of the plurality of displays, wherein the status information includes at least an operating condition, operating requirements, and a display priority;

polling sensors for information indicating current conditions of the wireless communication device;

evaluating a viability of each of the plurality of displays based on the stored status information and the information indicating the current conditions of the wireless communication device;

evaluating a user interaction with each of the plurality of displays based on the information indicating the current conditions of the wireless communication device; and re-calculating the priority of each of the plurality of displays based on at least one of the evaluated viability of each of the plurality of displays and the evaluated user interaction.

49. The wireless communication device of claim 48, wherein the current conditions of the wireless communication device include at least one of an ambient temperature based on thermistor sensor data, an ambient brightness based on camera data, a device altitude based on GPS data, a device movement based on gyroscope sensor data, a device inclination based on the gyroscope sensor data, user inputs on a touchscreen, and an identity of a user based on the camera data or microphone data.

50. The wireless communication device of claim 48, wherein the user interaction indicates at least one of a user is looking at a display based on eye tracking, the user is looking at a display based on head tracking, and the user is touching a display.

51. The wireless communication device of claim 48, wherein the processor is configured with processor-executable instructions such that re-calculating the priority of each of the plurality of displays based on at least one of the evaluated viability of each of the plurality of displays and the evaluated user interaction comprises re-calculating for each of the plurality of applications the priority of each of the plurality of displays based on at least one of the evaluated viability of each of the plurality of displays and the evaluated user interaction.

52. A wireless communication device, comprising:
a memory; and
a processor coupled to the memory, wherein the processor is configured with processor-executable instructions to perform operations comprising:

determining via an arbiter a first application of a plurality of applications that controls a display of the wireless communication device based upon predetermined criteria in response to receiving a notification event that simultaneously invokes more than one application;

detecting, in response to determining via the arbiter that the first application controls the display, a change in a control of the display from the first application in the plurality of applications to a second application in the plurality of applications;

identifying a first input received before the detected change in the control of the display and a second input received after the detected change in the control of the display;

determining whether the first input was received within a first time threshold of the detected change in the control of the display;

determining whether the second input was received within a second time threshold of the detected change in the control of the display; and associating the second input with the second application in response to determining that the first input was not received within the first time threshold or the second input was not received within the second time threshold.

53. The wireless communication device of claim 52, wherein the first input and the second input are both one of touch inputs, text inputs, spoken inputs, or visual inputs.

54. The wireless communication device of claim 52, wherein the processor is configured with processor-executable instructions further comprising associating the second input with the first application in response to determining that the first input was received within the first time threshold and that the second input was received within the second time threshold.

55. The wireless communication device of claim 52, wherein the processor is configured with processor-executable instructions further comprising:
rendering a prompt requesting a user selection input for associating the second input with one of the first application and the second application in response to determining that the first input was received within the first time threshold and the second input was received within the second time threshold;
receiving the user selection input via a user interface; and
associating the second input with one of the first application and the second application based on the received user selection input.

56. The wireless communication device of claim 55, wherein:
the first input is a verbal input;
the prompt is a second sound; and
wherein the processor is configured with processor-executable instructions further comprising rendering a first sound prior to detecting the change in the control of the display.

57. The wireless communication device of claim 52, wherein the processor is configured with processor-executable instructions further comprising:
evaluating a content of the first input and the second input in response to determining that the first input was received within the first time threshold and the second input was received within the second time threshold;
evaluating a launch time of the second application in relation to the detected change in the control in response to determining that the first input was received within the first time threshold and the second input was received within the second time threshold; and
associating the second input with the first application or the second application based on at least one of the evaluated content and the evaluated launch time.

58. The wireless communication device of claim 57, wherein the content is at least one of a grammar, a spelling, a punctuation, a format, a context, and an interpreted meaning.

59. The wireless communication device of claim 52, wherein the second input is a touch input, and wherein the processor is configured with processor-executable instructions further comprising:
identifying a second user interface element of the second application corresponding to the second input in response to determining that the first input was received within the first time threshold and the second input was received within the second time threshold;
determining whether the identified second user interface element of the second application coincides with a first user interface element of the first application; and
associating the second input with the first application in response to determining that the identified second user interface element coincides with the first user interface element.

60. A wireless communication device, comprising:
a memory; and
a processor coupled to the memory, wherein the processor is configured with processor-executable instructions to perform operations comprising:
determining via an arbiter a first application of a plurality of applications controls a display of the wireless communication device based upon predetermined criteria in response to receiving a notification event that simultaneously invokes more than one application;
determining whether a second application of the plurality of applications did not comply with the determination via the arbiter that the first application of the plurality of applications controls the display; and
terminating the second application in response to determining that the second application of the plurality of applications did not comply.

61. A non-transitory processor-readable storage medium having stored thereon processor-executable software instructions configured to cause a processor to perform operations comprising:
determining via an arbiter a first application of a plurality of applications that controls one of a plurality of displays based upon predetermined criteria in response to receiving a first notification event that simultaneously invokes more than one application;
determining whether an activity relevant to a second application of the plurality of applications is detected in response to determining via the arbiter that the first application controls the one of the plurality of displays;
ordering a list of viable displays of the plurality of displays in order of priority for the second application in response to detecting the activity relevant to the second application;
selecting a display in the ordered list of viable displays of the plurality of displays;
determining whether the selected display is in use by a third application; and
sending to the second application a flag that assigns control of a foreground of the selected display in response to determining the selected display is not in use by the third application.

62. The non-transitory processor-readable storage medium of claim 61, wherein the stored processor-executable software instructions are configured to cause the processor to perform operations further comprising sending to the second application the flag that assigns the control of the foreground of the selected display in response to determining that the selected display is in use by the third application and a priority of the third application is lower than a priority of the second application.

63. The non-transitory processor-readable storage medium of claim 61, wherein the activity is at least one of a second notification event, a predefined event indicated within registration information associated with the second application, an encountered exception, a priority change of one of the plurality of applications, a registration of a new application with the arbiter, a change in an operating status of one of the plurality of applications, a loss of control of a display foreground by one of the plurality of applications, and a change in activity state of one of the plurality of displays.

64. The non-transitory processor-readable storage medium of claim 61, wherein the stored processor-executable software instructions are configured to cause the processor to perform operations further comprising adding the second application to a wait queue for the selected display in response to determining that the selected display is in use by the third application of the plurality of applications and the priority of the third application is higher than the priority of the second application.

65. The non-transitory processor-readable storage medium of claim 61, wherein the stored processor-executable software instructions are configured to cause the processor to perform operations further comprising registering each of the plurality of applications with the arbiter in response to one of a boot-up of a computer platform, an activation of each of the plurality of applications, and a received request for registration, and wherein the stored processor-executable software instructions are configured to cause the processor to perform operations such that registering each of the plurality of applications with the arbiter comprises storing registration information for each of the plurality of applications.

66. The non-transitory processor-readable storage medium of claim 65, where the registration information for an individual application of the plurality of applications includes at least one of an identification, a priority, network requirements, an indication of whether the individual application may be dynamically reprioritized, and an indication of whether the individual application can be used on a secondary display of the plurality of displays, and an indication of whether the individual application is background-enabled.

67. The non-transitory processor-readable storage medium of claim 66, wherein the stored processor-executable software instructions are configured to cause the processor to perform operations further comprising re-calculating priorities for each of the plurality of applications that is registered for dynamic reprioritization.

68. The non-transitory processor-readable storage medium of claim 61, wherein the stored processor-executable software instructions are configured to cause the processor to perform operations further comprising:

storing status information for each of the plurality of displays, wherein the status information includes at least an operating condition, operating requirements, and a display priority;
polling sensors for information indicating current conditions of a wireless communication device;
evaluating a viability of each of the plurality of displays based on the stored status information and the information indicating the current conditions of the wireless communication device;
evaluating a user interaction with each of the plurality of displays based on the information indicating the current conditions of the wireless communication device; and
re-calculating the priority of each of the plurality of displays based on at least one of the evaluated viability of each of the plurality of displays and the evaluated user interaction.

69. The non-transitory processor-readable storage medium of claim 68, wherein the current conditions of the wireless communication device include at least one of an ambient temperature based on thermistor sensor data, an ambient brightness based on camera data, a device altitude based on GPS data, a device movement based on gyroscope sensor data, a device inclination based on the gyroscope sensor data, user inputs on a touchscreen, and an identity of a user based on the camera data or microphone data.

70. The non-transitory processor-readable storage medium of claim 68, wherein the user interaction indicates at least one of a user is looking at a display based on eye tracking, the user is looking at a display based on head tracking, and the user is touching a display.

71. The non-transitory processor-readable storage medium of claim 68, wherein the stored processor-executable software instructions are configured to cause the processor to perform operations such that re-calculating the priority of each of the plurality of displays based on at least one of the evaluated viability of each of the plurality of displays and the evaluated user interaction comprises re-calculating for each of the plurality of applications the priority of each of the plurality of displays based on at least one of the evaluated viability of each of the plurality of displays and the evaluated user interaction.

72. A non-transitory processor-readable storage medium having stored thereon processor-executable software instructions configured to cause a processor to perform operations comprising:

determining via an arbiter a first application of a plurality of applications that controls a display of a wireless communication device based upon predetermined criteria in response to receiving a notification event that simultaneously invokes more than one application;
detecting, in response to determining via the arbiter that the first application controls the display, a change in a control of the display from the first application in the plurality of applications to a second application in the plurality of applications;
identifying a first input received before the detected change in the control of the display and a second input received after the detected change in the control of the display;
determining whether the first input was received within a first time threshold of the detected change in the control of the display;
determining whether the second input was received within a second time threshold of the detected change in the control of the display; and
associating the second input with the second application in response to determining that the first input was not received within the first time threshold or the second input was not received within the second time threshold.

73. The non-transitory processor-readable storage medium of claim 72, wherein the first input and the second input are both one of touch inputs, text inputs, spoken inputs, or visual inputs.

74. The non-transitory processor-readable storage medium of claim 72, wherein the stored processor-executable software instructions are configured to cause the processor to perform operations further comprising associating the second input with the first application in response to determining that the first input was received within the first time threshold and that the second input was received within the second time threshold.

75. The non-transitory processor-readable storage medium of claim 72, wherein the stored processor-executable software instructions are configured to cause the processor to perform operations further comprising:

rendering a prompt requesting a user selection input for associating the second input with one of the first application and the second application in response to determining that the first input was received within the first time threshold and the second input was received within the second time threshold;
receiving the user selection input via a user interface; and
associating the second input with one of the first application and the second application based on the received user selection input.

76. The non-transitory processor-readable storage medium of claim 75, wherein:

the first input is a verbal input;

the prompt is a second sound; and wherein the stored processor-executable software instructions are configured to cause the processor to perform operations further comprising rendering a first sound prior to detecting the change in the control of the display.

77. The non-transitory processor-readable storage medium of claim 72, wherein the stored processor-executable software instructions are configured to cause the processor to perform operations further comprising:

evaluating a content of the first input and the second input in response to determining that the first input was received within the first time threshold and the second input was received within the second time threshold;

evaluating a launch time of the second application in relation to the detected change in the control in response to determining that the first input was received within the first time threshold and the second input was received within the second time threshold; and associating the second input with the first application or the second application based on at least one of the evaluated content and the evaluated launch time.

78. The non-transitory processor-readable storage medium of claim 77, wherein the content is at least one of a grammar, a spelling, a punctuation, a format, a context, and an interpreted meaning.

79. The non-transitory processor-readable storage medium of claim 72, wherein the second input is a touch input, and wherein the stored processor-executable software instructions are configured to cause the processor to perform operations further comprising:

identifying a second user interface element of the second application corresponding to the second input in response to determining that the first input was received within the first time threshold and the second input was received within the second time threshold;

determining whether the identified second user interface element of the second application coincides with a first user interface element of the first application; and associating the second input with the first application in response to determining that the identified second user interface element coincides with the first user interface element.

80. A non-transitory processor-readable storage medium having stored thereon processor-executable software instructions configured to cause a processor to perform operations comprising:

determining via an arbiter a first application of a plurality of applications controls a display of a wireless communication device based upon predetermined criteria in response to receiving a notification event that simultaneously invokes more than one application;

determining whether a second application of the plurality of applications did not comply with the determination via the arbiter that the first application of the plurality of applications controls the display; and terminating the second application in response to determining that the second application of the plurality of applications did not comply.

* * * * *